United States Patent [19]

Larson

[11] Patent Number: 4,729,096

[45] Date of Patent: Mar. 1, 1988

[54] METHOD AND APPARATUS FOR GENERATING A TRANSLATOR PROGRAM FOR A COMPILER/INTERPRETER AND FOR TESTING THE RESULTING TRANSLATOR PROGRAM

[75] Inventor: Lawrence E. Larson, Vestal, N.Y.

[73] Assignee: International Business Machines Corporation, Armonk, N.Y.

[21] Appl. No.: 664,264

[22] Filed: Oct. 24, 1984

[51] Int. Cl.[4] .............................................. G06F 11/04
[52] U.S. Cl. .................................................... 364/300
[58] Field of Search ... 364/200 MS File, 300 MS File, 364/900 MS File

[56] References Cited

FOREIGN PATENT DOCUMENTS 1479122 7/1977 United Kingdom .
1510240 5/1978 United Kingdom .

OTHER PUBLICATIONS

*Compiler Construction for Digital Computers*, Gries, David, Wiley and Sons, 1971, FIG. 20.1, Structure of a TWS, p. 438.
"Yet Another Translator Writing System Based on Attribute Grammars", Farrow, Rodney, Sigplan Notices, vol. 17(6), 1982, pp. 160–171.
*The Theory and Practice of Compiler Writing*, Tremblay, Jean-Paul, McGraw Hill, 1985, Compiler-Compilers, Bibliography, pp. 764–766.

*Primary Examiner*—Raulfe B. Zache
*Assistant Examiner*—Michael J. Ure
*Attorney, Agent, or Firm*—John H. Bouchard

[57] ABSTRACT

A translator writing system develops a translator program capable of transforming a user's source code into object code. The language of the source code is summarized in a unique form, namely, a Backus-Nauer Form (BNF). This BNF form of the source code is utilized by the translator writing system to transform the source code into object code. The BNF form takes into account the attribute specifications associated with the language of the source code and the interaction of the attribute specifications in the grammar of the language of the source code. The translator writing system includes a valid testcase generator for testing the developed translator program utilizing every possible correct program statement in the language of the user's source code. The translator writing system further includes an incorrect, invalid testcase generator for testing the developed translator program utilizing every possible incorrect, invalid program statement in the language of the user's source code. As a result, the amount of effort required to test the developed translator program has been significantly reduced.

8 Claims, 26 Drawing Figures

METHOD AND APPARATUS FOR GENERATING A TRANSLATOR PROGRAM FOR A COMPILER/INTERPRETER AND FOR TESTING THE RESULTING TRANSLATOR PROGRAM

BACKGROUND OF THE INVENTION

1. Field of the Invention

The subject matter of this invention pertains to a computer system, and more particularly, to an apparatus within the computer system for automating the generation of translators and test cases needed for the verification and testing of said translators.

2. Description of the Prior Art

Compilers and interpreters are utilized by a computer system to transform a set of source code into a set of machine-readable object code. The compilers/interpreters generally comprise a data processing system and a translator program stored in said system. The data processing system under the control of the accompanying translator program receives the user's source code and transforms said code into the machine readable object code.

When the translator program is developed, it must be tested. Testing a translator program may require several man-years of testing effort.

Translator writing systems have been developed to aid in reducing the amount of time required to develop and test the translator program. These writing systems develop the translator program required by the compilers/interpreters. However, the translator writing systems of the prior art possess certain disadvantages.

Any set of translator software must utilize certain basic rules in performing a compilation function. For example, in an operation designated as "A+B*C", it must be determined whether the operation represented by "+" should be performed before or after the operation represented by "*". In making this determination, a set of rules for constructing symbol strings of a programming language should be utilized. This set of rules is known as the grammar of a language. In addition, in the above operation, a semantic analysis determines what particular actions are specified by the operations "+" and "*", that is, semantic analysis determines the meaning of the user's source code. Furthermore, the meaning of a symbol present in a user's source code is expressed by means of its attributes. Among possible attributes are source-text line numbers, type, number of dimensions, length of each dimension, internal tree structure, and storage class. For further information on these basic rules utilized by translator software in performing the compilation function, reference is directed to a book entitled "Assemblers, Compilers, and Program Translation", by Peter Calingaert, published by Computer Science Press, Inc.

Translator programs developed by the translator writing systems of the prior art did not take into account the attribute specifications required by the language of the source code being compiled and did not take into account the interaction of the attribute specifications in the grammar associated with the language of said source code. In addition, it was necessary to manually place semantic module invocations, associated with the above-mentioned semantic analysis, in the translator program developed by these translator writing systems. Manual placement of the semantic module invocations represented a major problem. The reason for the major problem is as follows: Translator writing systems act as compilers themselves, in that an original input grammar undergoes a compilation process producing a transformed grammar. Due to the manual placement of the semantic module invocations in the translator program produced by these writing systems, there was no way to relate the transformed grammar used by the system to the original input grammar. In addition, once the translator program was developed and stored in its associated data processing system environment, testing of the translator program required a tremendous amount of effort, the amount of effort required being measured in terms of man-years of testing effort.

SUMMARY OF THE INVENTION

It is a primary object of the present invention to provide an improved translator writing system designed to eliminate the disadvantages associated with the translator writing system of the prior art.

It is a further object of the present invention to provide an improved translator writing system possessing a novel test case production and testing capability.

It is a further object of the present invention to provide an improved translator writing system for developing a translator program in response to a language description representative of the language of the user's source code, the language description being a Backus-Nauer Form (BNF) definition of said language.

It is a further object of the present invention to provide an improved translator writing system wherein the BNF definition of the language of the user's source code takes into account the attribute specifications associated with said language and the interaction of the attribute specifications in the grammar of said language.

It is a further object of the present invention to provide an improved translator writing system wherein the BNF definition of said language correctly and automatically places the semantic module invocations in the developed translator program.

In accordance with these and other objects of the present invention, an improved translator writing system is provided for developing a translator program in response to a language description representative of the language of a user's source code, the language description being a Backus-Nauer Form (BNF) definition of said language. The translator writing system is characterized by a data processing system and a translator writing program stored in said system for developing the translator program in response to the input language description. The developed translator program is used by a compiler, for example, to transform the user's source code into corresponding object code, the object code being used by a computer system to control and direct the performance of certain functions defined by said code. The format of the BNF definition of said language is unique, and takes into account certain attribute specifications required by the language of the user's source code and the interaction of the attribute specifications in the grammar associated with the source code. Furthermore, the translator writing system automatically places the semantic module invocations in the developed translator program. In addition, the translator writing system of the present invention further possesses a test case production and interrogation capability. The translator writing system includes a data base comprising a complete set of accurate and correct language statements and a complete set of erroneous statements. The accurate statements are developed by the translator writing system of the present invention for testing the developed translator program used by said compiler and for analyzing the results produced as a result of the testing. The erroneous statements are developed for testing the developed translator program to determine if all of the proper error messages are produced as a result of the testing. The translator writing system includes a translator writing program which, in association with its data processing system, produces the translator program used by the compiler/interpreter in response to the BNF definition of the user's source code.

Further scope of applicability of the present invention will become apparent from the description given hereinafter. However, it should be understood that the details of the description and the specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

A full understanding of the present invention will be obtained from the detailed description given hereinbelow and the accompanying drawings, which are given by way of illustration only, and thus are not limitative of the present invention, and wherein.

DESCRIPTION OF THE PREFERRED EMBODIMENT

Figure 1:
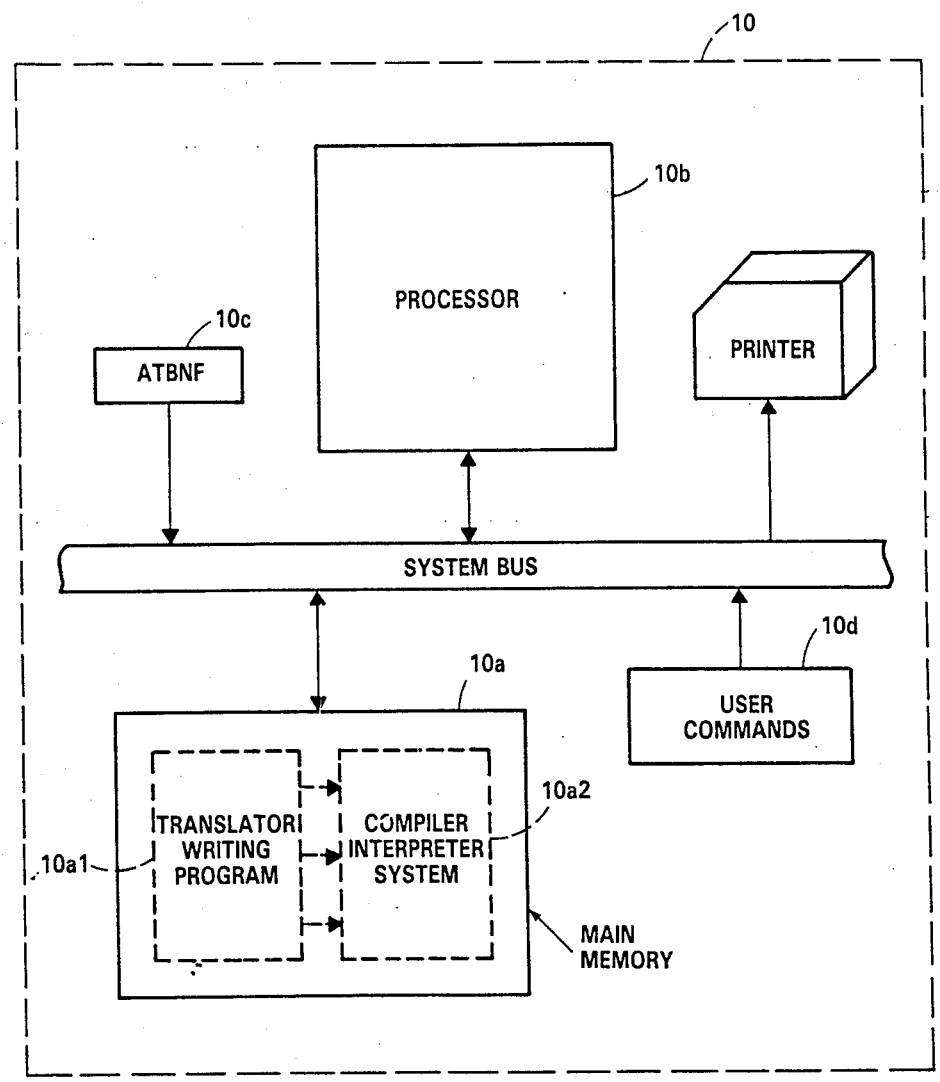
FIG. 1 illustrates a basic block diagram of a translator writing system including the data processing system and the stored translator writing program according to the present invention.

Referring to FIG. 1, a translator writing system 10 according to the present invention is illustrated. The translator writing system 10, as set forth in the following paragraphs, is implemented primarily in software. However, the software is utilized by a hardware system to perform the unique function of the present invention. It should be understood, however, that the translator writing system 10 could be implemented primarily or completely in hardware to perform the unique function of the present invention. The translator writing system 10 includes a data processing system and a translator writing program stored within said data processing system. The data processing system includes a system bus, a main memory 10a connected to the system bus for storing a translator writing program 10a1 (otherwise termed a compiling machine) and a compiler/interpreter system 10a2 (otherwise termed a running machine), a processor 10b connected to the system bus, an ATBNF data entry and storage means 10c connected to the system bus for storing a Backus-Nauer Form (BNF) definition of the user's source code in software form, a user command input means 10d connected to the system bus for entering the user's source code, and a printer 10e connected to the bus for printing a set of results. A typical data processing system which may be utilized to perform the function of the data processing system described above is set forth in a manual entitled "IBM System/370 Principles of Operation", developed by International Business Machines Corp., GA22-7000, the disclosure of which is hereby incorporated herein by reference.

Figure 2:
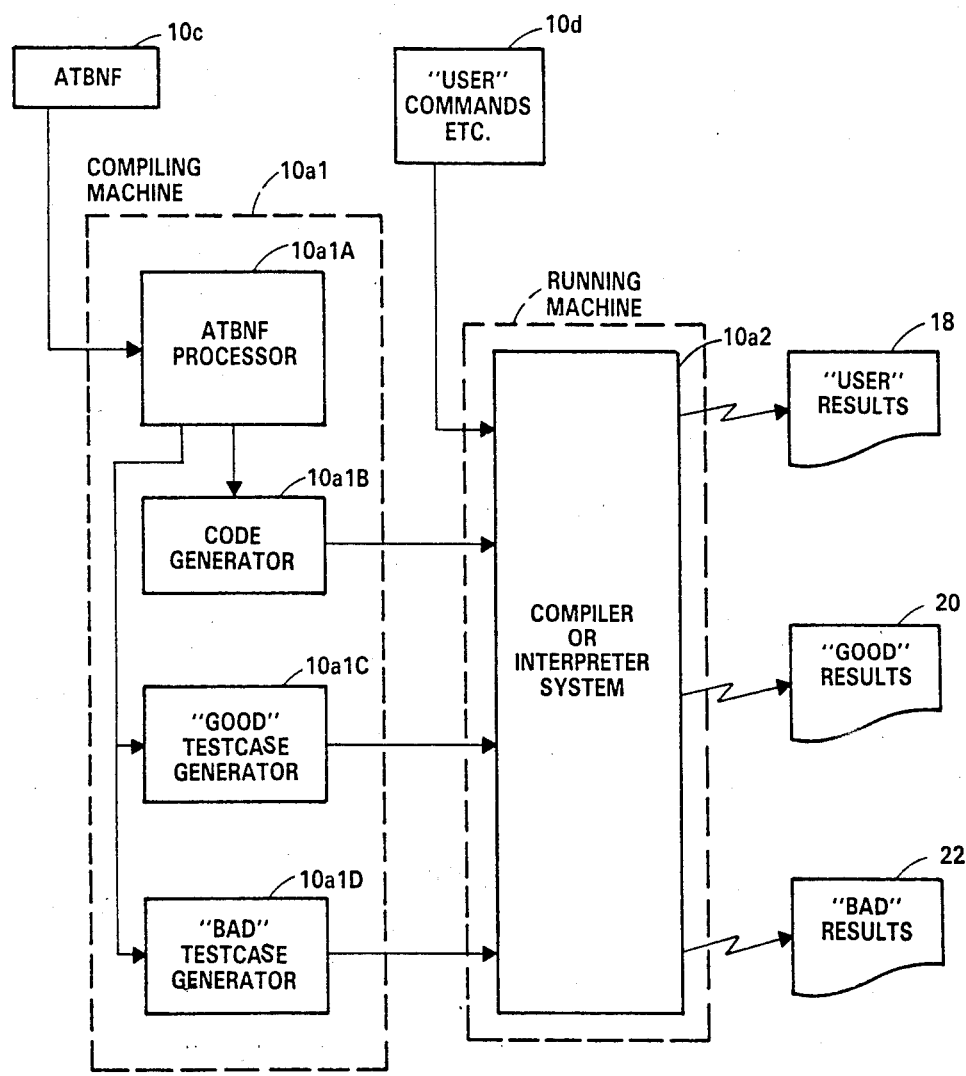
FIG. 2 illustrates a more detailed construction of the translator writing program stored in the data processing system of FIG. 1 for developing the translator program, and a compiler/interpreter system stored in the data processing system for utilizing the translator program to create object code from a user's source code.

Referring to FIG. 2, a more detailed construction of the translator writing program 10a1 of FIG. 1 is illustrated. In FIG. 2, the translator writing program 10a1 comprises an ATBNF processor 10a1A, a code generator 10a1B connected to the processor 10a1A, a "good" test case generator 10a1C connected to the processor 10a1A, and a "bad" test case generator 10a1D connected to the processor 10a1A.

As mentioned hereinabove, the user's source code is represented by an input language description of said source code, that is, by a Backus-Nauer Form (BNF) definition of said code. The language of the BNF definition is unique and specific, and is discussed in detail in a book entitled "A Computer Generator" by William McKeeman, James Horning, and David Wortman, published by Prentice Hall. The language of the BNF definition is also discussed in a book entitled "Compiler Construction for Digital Computers" by David Gries, published by John Wiley and Sons, Inc. The disclosure in these books are hereby incorporated herein by reference.

In FIG. 2, the ATBNF data entry and storage means 10c stores the BNF definition of the user's source code in software-program form. The user's source code, per se, is stored in a memory disposed within the user command input means 10d of FIG. 2. A compiler (or interpreter) 10a2 receives the user's source code and, in the case of a compiler, transforms the source code into object code, the object code being the "user results" 18 shown in FIG. 2.

The operation of the invention illustrated in FIGS. 1 and 2 will be discussed in the paragraphs below.

Referring collectively to FIGS. 1 and 2, the BNF definition of the user's source code is entered into the translator writing system 10 via the ATBNF data entry and storage means 10c and is stored within the main memory 10a. The ATBNF processor 10a1A, a portion of the translator writing program 10a1, receives the BNF definition and compiles said definition thereby transforming said definition into a form readable by the code generator 10a1B. As a result, a transformed BNF definition (or a transformed grammar definition) is produced. The code generator 10a1B receives the transformed BNF definition from processor 10a1A, and produces the translator program. The translator program is stored within the main memory 10a and forms a portion of the compiler/interpreter system 10a2. The compiler/interpreter system 10a2 utilizes said translator program to transform the user's source code, entered via the user command input means 10d, into object code. The object code is represented by the "user" results 18 of FIG. 2.

The "good" testcase generator 10a1C is essentially a data base containing many example program statements written in the user's source language. The example program statements are written in correct form and therefore represent valid program statements. With respect to the number and type of program statements contained within the data base, every possible correct program statement or language example occurs at least once.

The "bad" testcase generator 10a1D is also a data base, however, this data base contains many incorrect or otherwise invalid program statements written in the user's source language. With respect to the number and type of program statements contained within this data base, every possible incorrect, invalid program statement or language example occurs at least once.

When the translator program is stored within the compiler/interpreter 10a2 portion of the main memory 10a, the ATBNF processor 10a1A instructs the "good" testcase generator 10a1C to interrogate and test the translator program utilizing the stored correct program statements. The translator program receives the correct program statements and transforms the statements into object code. A set of results are produced, illustrated as the "good" results 20 shown in FIG. 2 of the drawings. The user may then analyze the "good" results 20 to ensure that the translator program and the compiler 16 are operating properly.

The ATBNF processor 10a1A then instructs the "bad" testcase generator 10a1D to interrogate and test the translator program utilizing the stored, incorrect, invalid program statements. The translator program attempts to transform the incorrect program statements into object code. However, in lieu of object code, the compiler/interpreter system 10a2 generates a multitude of error messages representative of the invalid, incorrect program statements undergoing compilation, the multitude of error messages being illustrated as the "bad" results 22 in FIG. 2 of the drawings. The user may then analyze the "bad" results 22 to ensure that all of the proper error messages are being generated by the compiler 10a2 corresponding, respectively, to all of the incorrect, invalid program statements. In this way, it is possible to determine if the translator program and the associated compiler/interpreter system 10a2 are operating properly.

DETAILED DESCRIPTION OF THE PREFERRED EMBODIMENT

In the following paragraphs, a further, more detailed description of the construction and operation of the translator writing program 10a1 illustrated in FIGS. 1 and 2 will be presented. However, in order to fully understand the construction and operation of the translator writing program 10a1, it is necessary to understand the meaning of various terms used by the ordinary person skilled in the art of computer systems.

When a sentence is diagrammed, the structure or syntax of the sentence is set forth. However, the diagrammed sentence does not set forth the meaning, or semantics, of the sentence itself. Such a syntactic description of the sentence is called a grammar. As a general rule, in the diagrammed sentence, a subject and predicate is utilized. Such a general rule may be described by the following rule which is described by the following mathematical symbology: <sentence> ::= <subject> <predicate>, where ::= connotes "may be composed of". The grammar of a sentence may contain more than one such rule. Alternatively, if a similar set of rules are devised (utilizing the format of the above mathematical symbology), describing a computer language in source code form, these rules may be used to derive or produce the source code of the computer language. These rules are often called productions. The word "symbol" and the word "token" are used synonymously. Each represent an element of a finite, nonempty set of elements. A sequence of symbols or tokens is called a string. Given a particular rule of a grammar, symbols appearing as a left part of a rule are called nonterminal symbols. Other symbols are called terminal symbols. For example, in the rule <digit> ::=3, the nonterminal symbol is "<digit>" and the terminal symbol is "3". The nonterminal symbols are recognized by use of the bracket symbol <..>. If U=x, U=y, and U=z, a more simplified expression may be written to convey the meaning of these equalities: U ::=x|y|z. Utilizing this expression, a grammar for a language may be written in the following form:

<number> ::= <no>
<no> ::= <no> <digit> | <digit>
<digit> ::=0 | 1 | 2 | 3 | 4 | 5 |

The above form of the language is defined to be the Backus-Nauer Form (BNF). The example of numbers above illustrates the need for transformations and data attribute specifications in the grammar definition. As an example, the numbers in sequence "2" and "5" are normally taken to be the number "25" . Similarly, the association is valid only if the characters involved are indeed numeric. Thus, 2 followed by 5 would be understood as 25; but, 2 followed by Z would not normally be a number 2Z. Additionally, the numbers must be encoded into a form the computer program can process.

The attribute information is specified in the grammar definition by using the notation A(numeric) which is a declaration that the data attribute required at this point in the language must be numeric.

The conversion of two characters to a single number recognizable by a computer is specified by F(XXX) where XXX is the name of a routine to do the conversion. The grammar for <number> modified to a processable form becomes:

<number> ::=F(ctr=0) <no>
<no> ::= <no> F(ctr2=ctr) <digit> A(num) F(ctr=ctr2*10+ctr) ! <digit> A(num)
<digit> ::= "0"F(ctr=0) F(attr=num) ! "1"F(ctr=1) F(attr=num) ! "2" F(ctr=2) F(attr=num) ! "3" F(ctr=3) F(attr=num) ! "4" F(ctr=4) F(attr=num) ! "5" F(ctr=5) F(attr=num) !

The grammar thus modified is an ATBNF specification of the number grammar that includes both attribute specifications and functional transformation (semantic) information. Note that a computer program is created from the definition that the value associated with the numeric character string is in a variable "ctr".

For further information regarding the meaning of the above terms, reference is directed to the book entitled "Compiler Construction for Digital Computers", by David Gries, published by John Wiley and Sons, Inc.

The following represents essential elements of the translator writing program 10a1 comprising the translator writing system 10 of the present invention:

(1) An abstract data structure of lists contains the BNF-like language specifications.

(2) An abstract data structure of arrays contains the intermediate relations of produces, follows, and ends-with. These structures tell the translator writing system how to produce the generated translator program.

(3) An abstract data structure of queues and deques contains the generated code strings for the translator program and for the test cases.

(4) An abstract data structure of a stack oriented machine serves as the implementation target of the translator program.

The translator writing program 10a1 functions in the following manner: The translator writing system 10 is given a set of productions representing the BNF definition of the user's source code via the ATBNF data entry and storage means 10c. The productions include a syntax description of the source code, the attributes constraints of the symbols used in the productions, and the declaration of processing modules to be invoked (semantic information) as the language is processed. The ATBNF processor 10a1A portion of the translator writing program 10a1 reduces the complexity of the BNF definition through a combination of language transformations and statement factoring techniques thereby developing the transformed BNF definition that is simpler to process. This transformation accounts for the presence of attribute and semantic module specifications in the language of the user's source code. The simplified productions, consisting of the transformed BNF definition, are read by the code generator 10a1B portion of the translator writing program 10a1. As a result, production selection values are computed. The selection values uniquely determine the production to be selected, and consist of terminal characters in the language and the definition of applicable attribute constraints. The code generator 10a1B generates a translator program that will process the user's source code. There are five characteristics of the generated translator program:

(1) Each production of the translator program results in the creation of a block structured procedure. A return statement, at the end of the procedure, returns control to the invoking program.

(2) The production selection values involving language terminals result in the creation of IF statements that test the values in the character string.

(3) The production selection values involving data attributes, that must be satisfied as the language is processed, result in the creation of IF statements that test attribute values stored on an attribute stack.

(4) The portion of the translator program specifying nonterminals results in CALLS to procedures having an encoded name related to the production name.

(5) The portion of the language specification of the translator program involving semantic routine invocations are converted to CALL invocations of modules to perform the operations specified.

After development of the translator program is complete, the translator writing program 10a1 creates two sets of test cases. The first set of testcases, generated by the "good" testcase generator 10a1C, consists of those language statements which are valid in the user's source language specified. Because the language involved is normally unbounded in size, the generation process is constrained to ensuring that every language example occurs at least once. This set of test cases is processed by the translator program. If every test run is successful, the generated translator program processes a language that contains the specified source language as a subset. The second set of test cases, generated by the "bad" testcase generator 10a1D, consists of language statements which are not valid in the specified source language. The testcase generation process is constrained to ensure that every non-language example occurs at least once. This set of test cases is processed by the generated translator program. If every testcase in this set is rejected by the translator program, a subset of the specified non-language has been accurately rejected by the translator program. As a result of the two tests, the translator program implements the specified source language and only the specified language.

In order to fully understand the structure and functional operation of the translator writing program 10a1, FIGS. 3a through 6b are provided for illustrating the structure and function of the individual components which comprise the translator writing program 10a1, namely, the processor 10a1A, the code generator 10a1B, the "good" testcase generator 10a1C, and the "bad" testcase generator 10a1D.

Figure 3A:
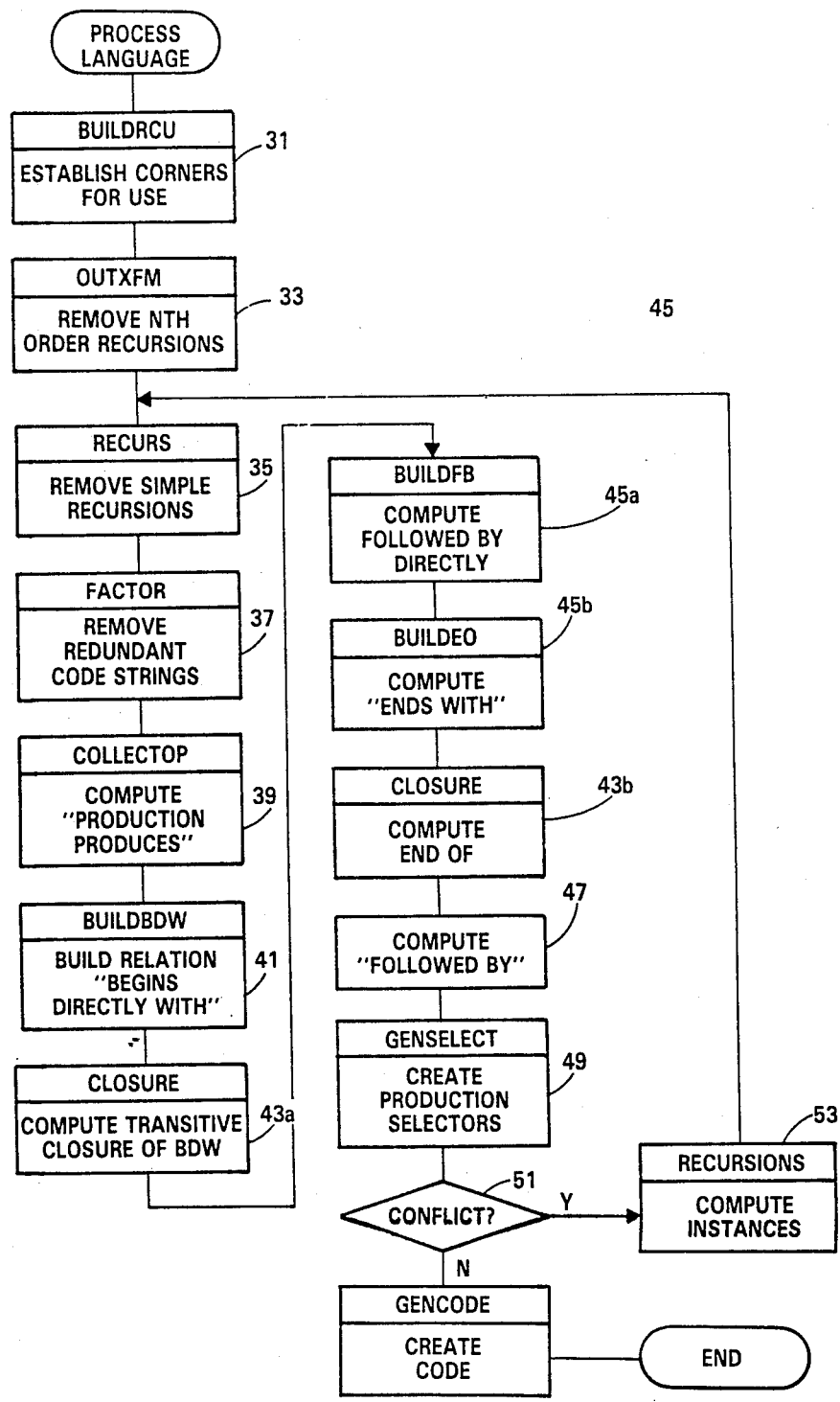
FIGS. 3a through 3a, 3k through 3N, 3P through 3Q, and 3j parts (a) and (b) illustrate a flow diagram representing the Attributed Translation Backus-Nauer Form (ATBNF) processor portion of the translator writing program of FIG. 2.
Figure 3B:
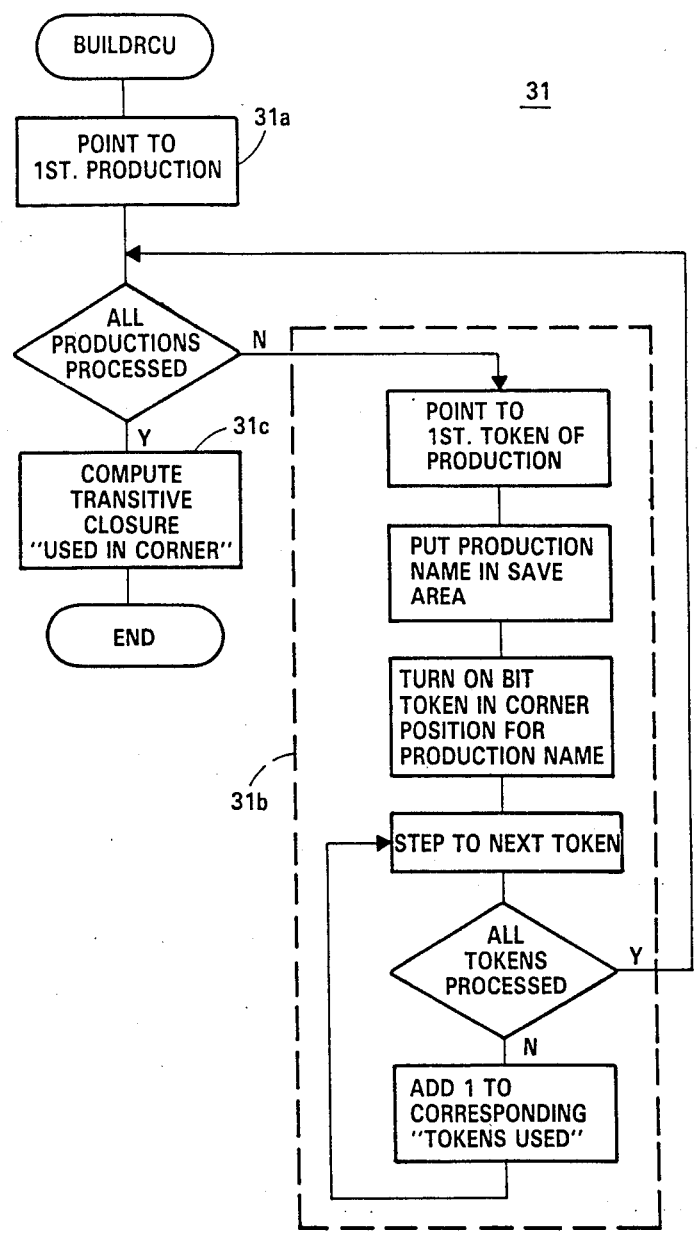
Figure 3C:
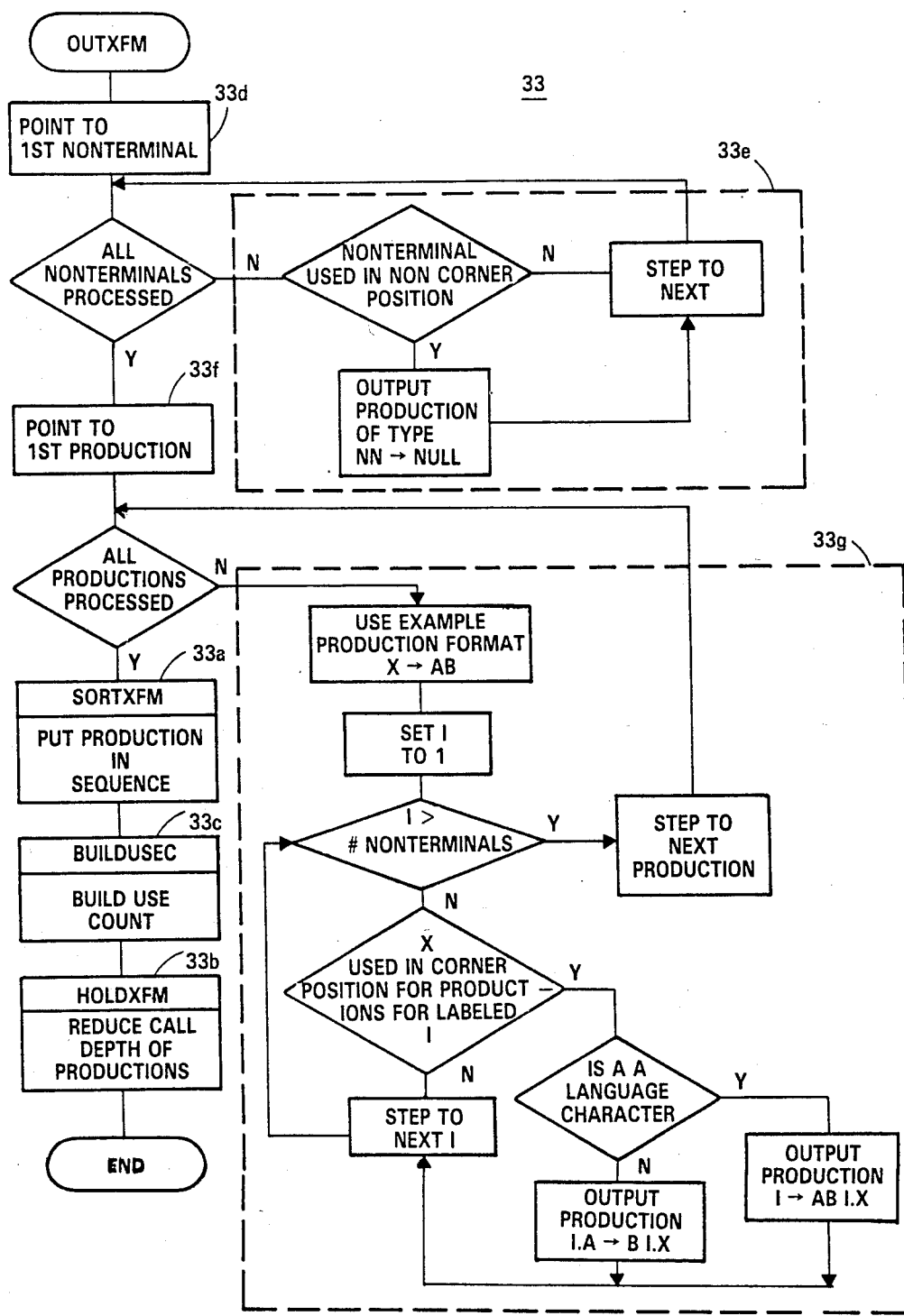
Figure 3D:
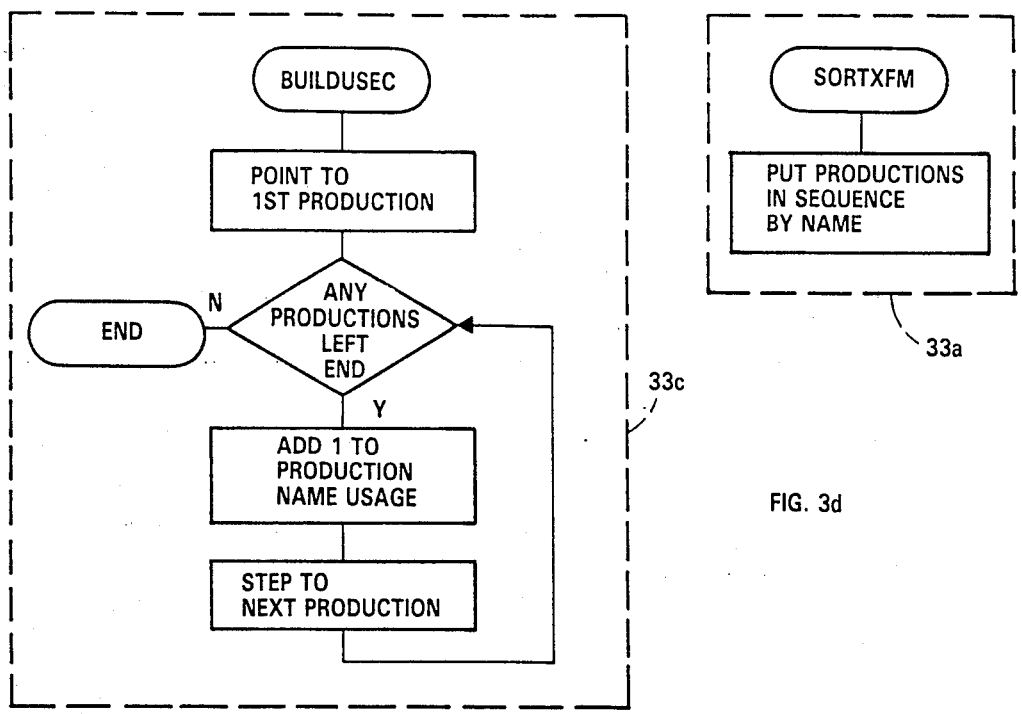
Figure 3G:
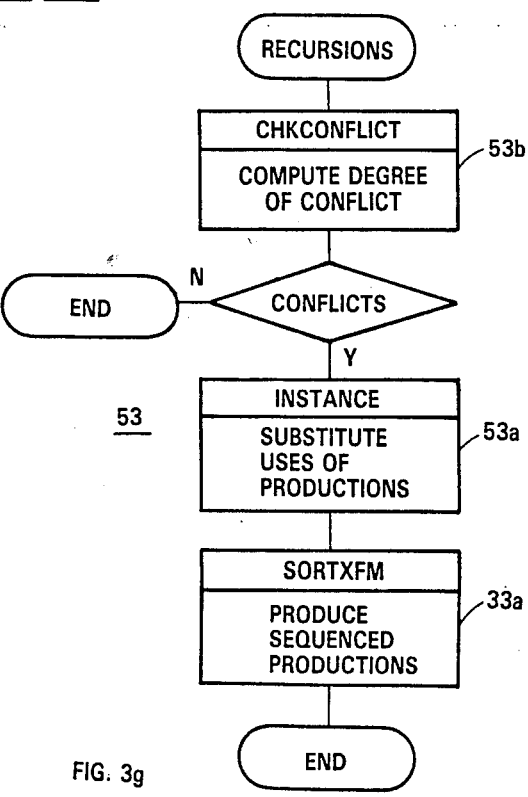
Figure 3E:
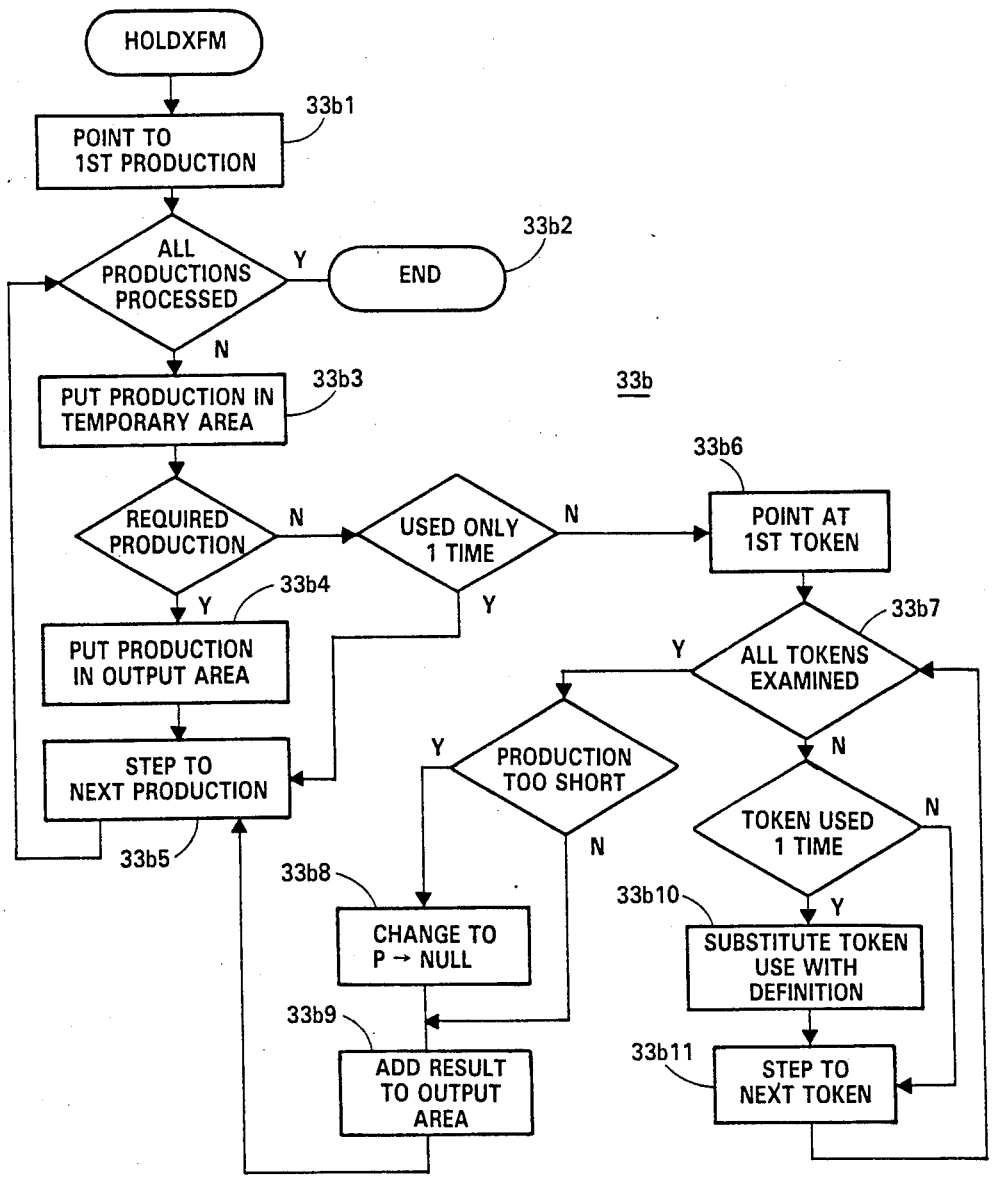
Figure 3F:
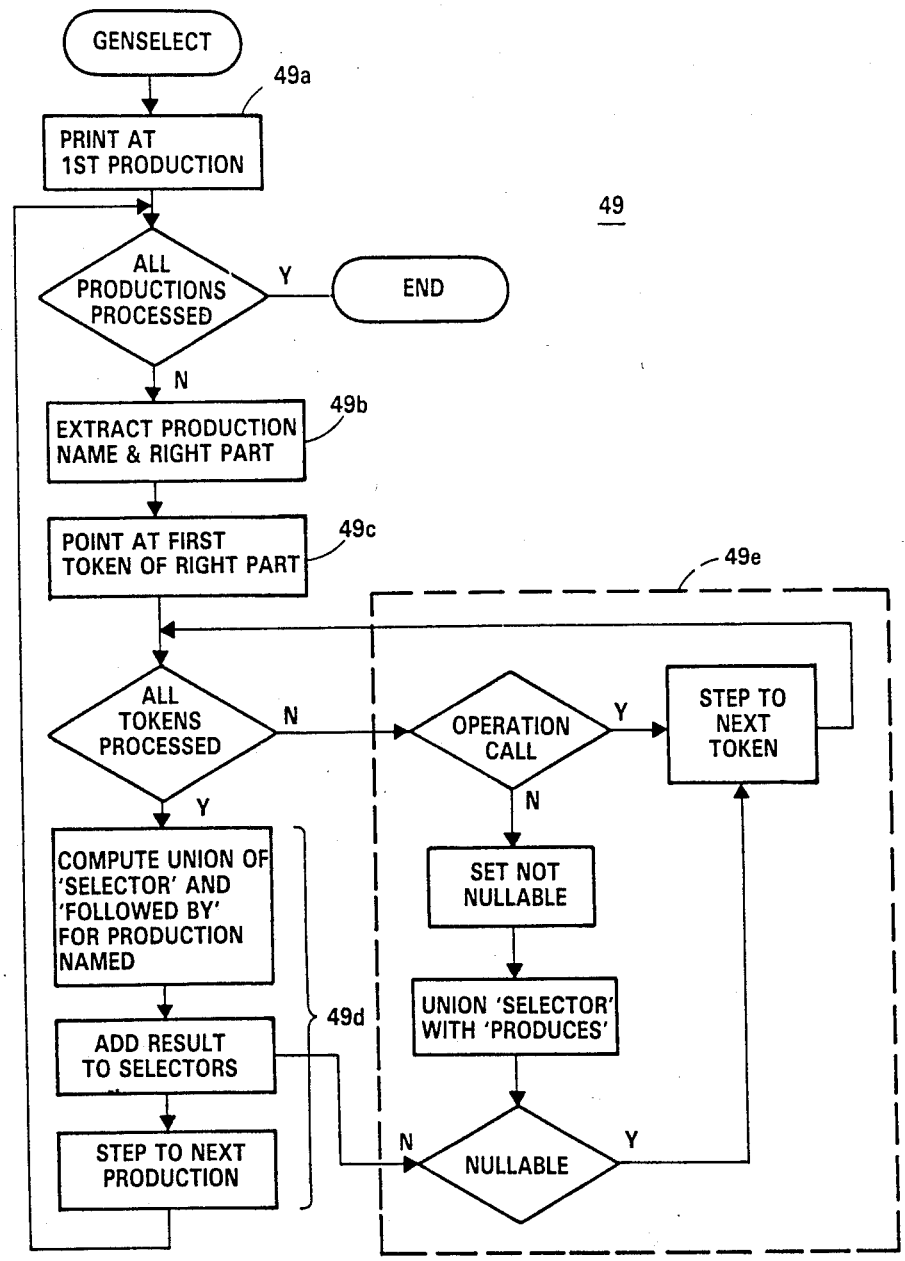
Figure 3H:
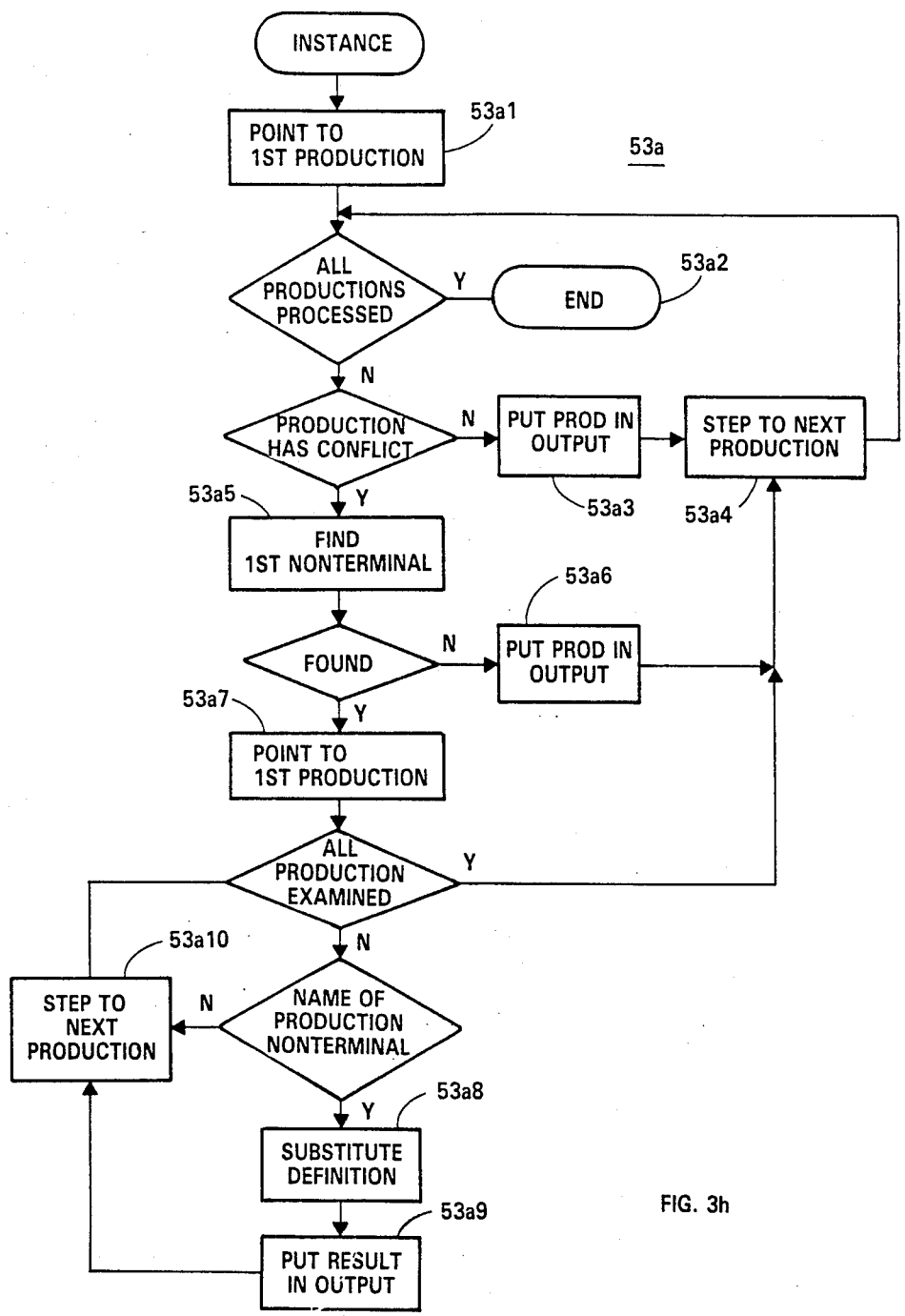
Figure 3I:
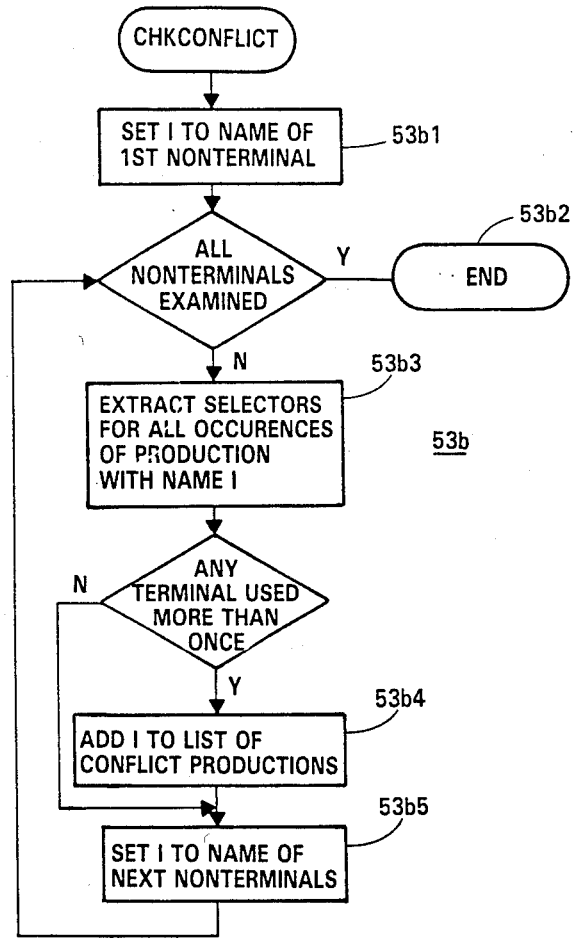
Figure 3J:
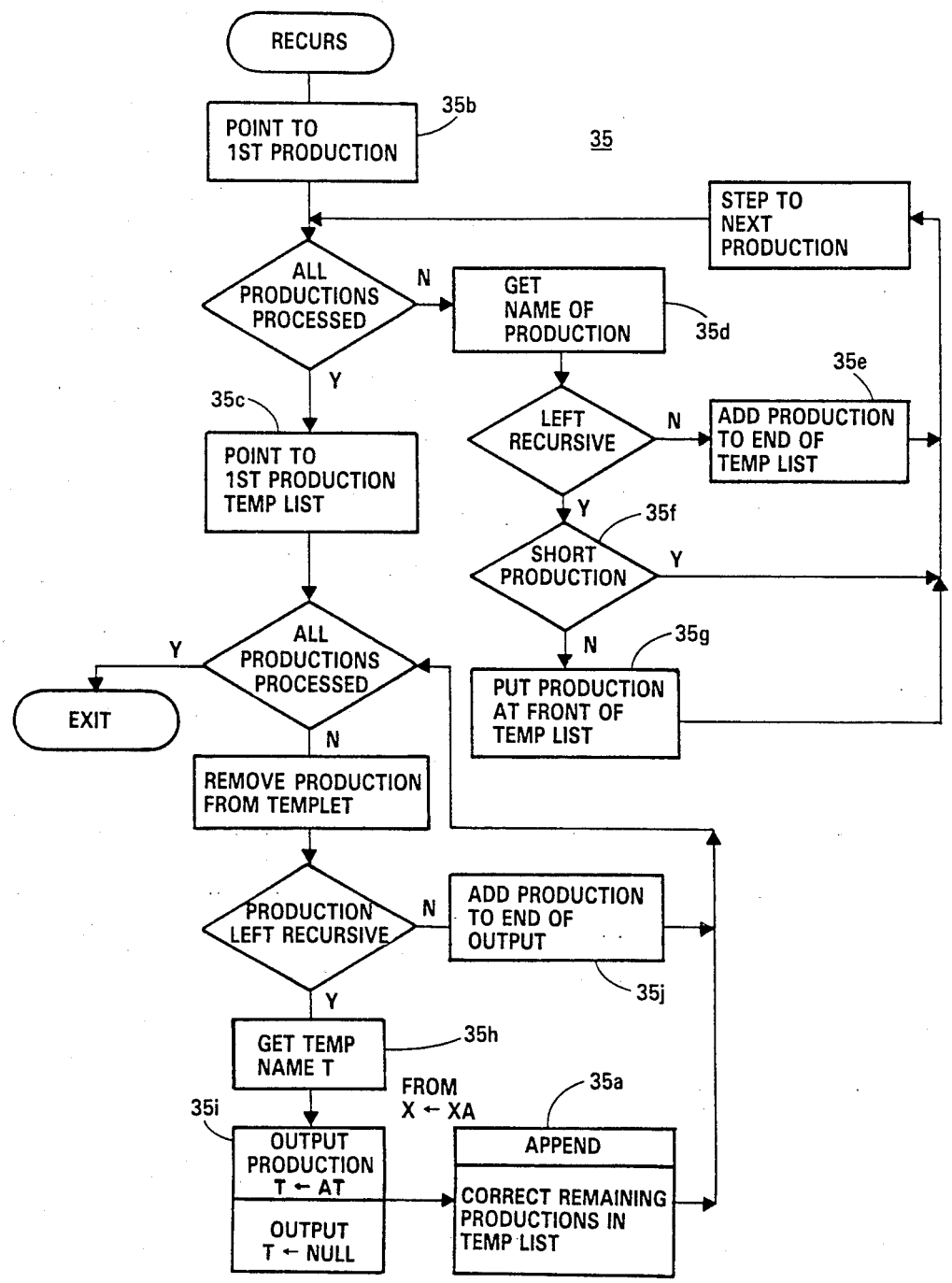
Figure 3J:
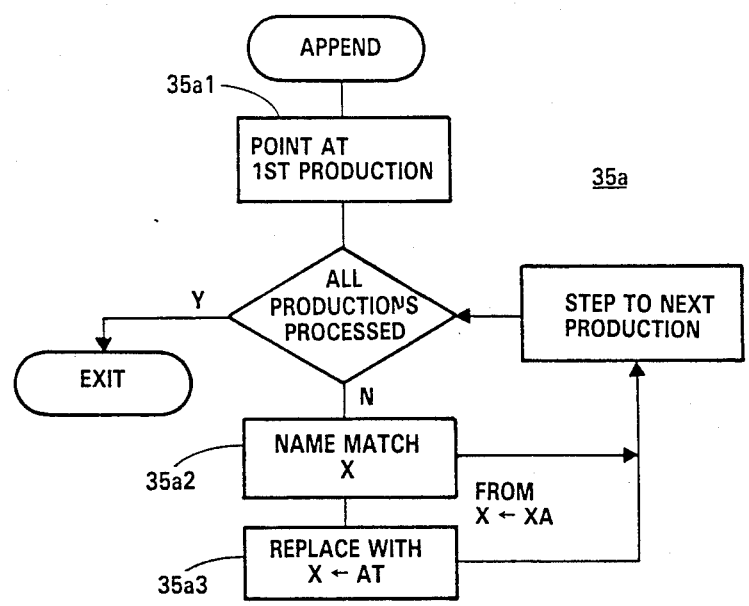
Figure 3K:
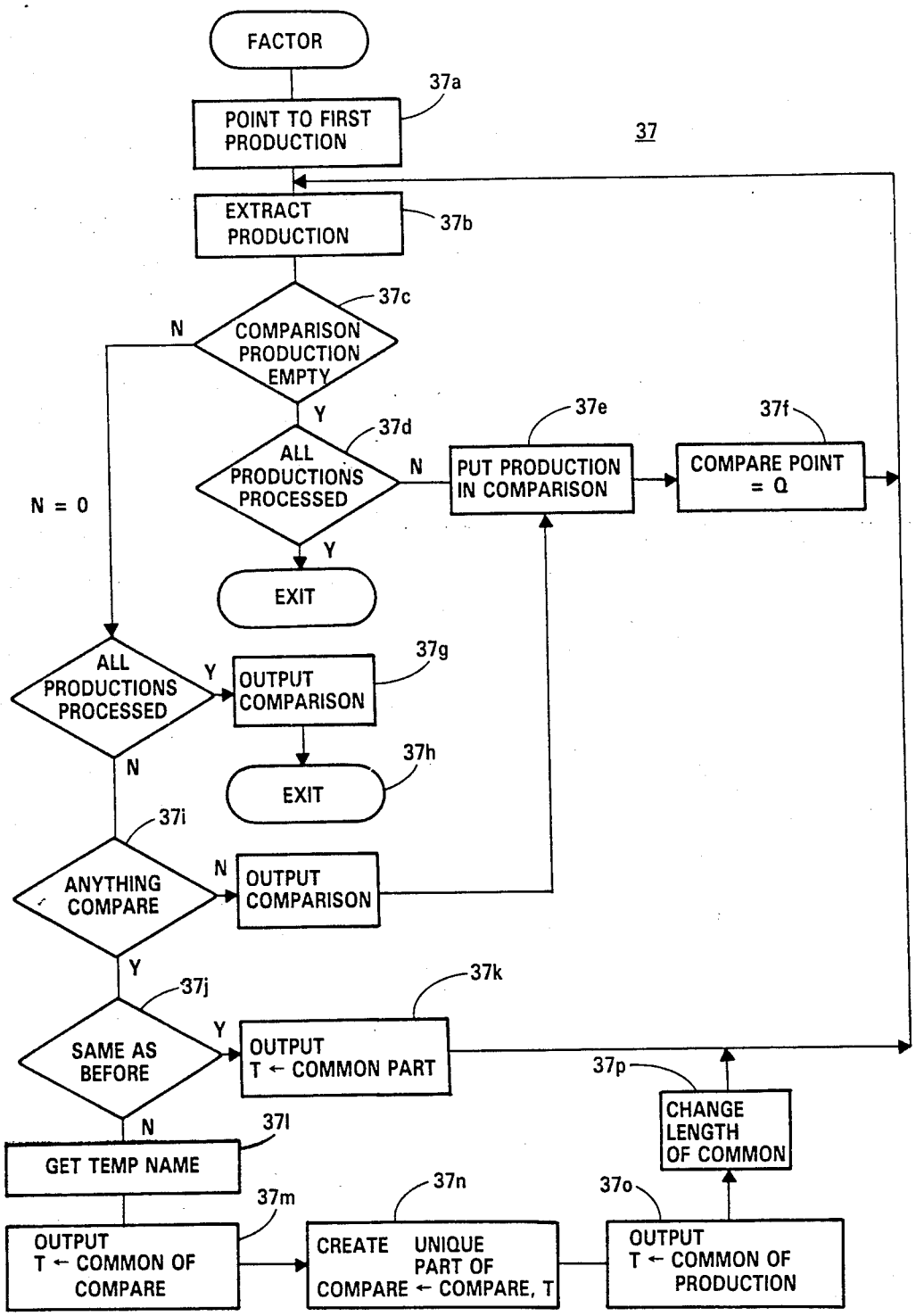
Figure 3L:
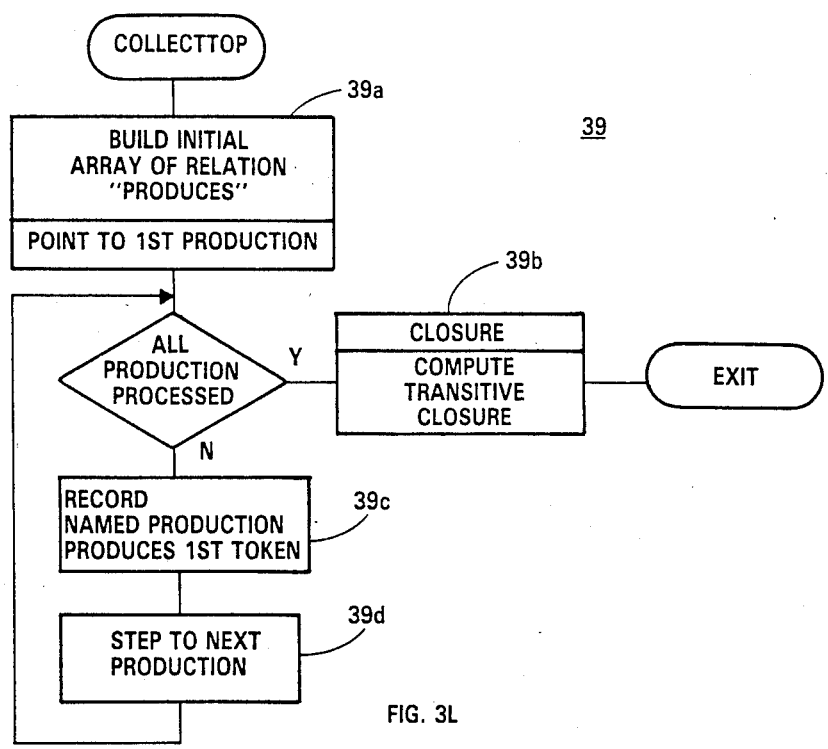
Figure 3N:
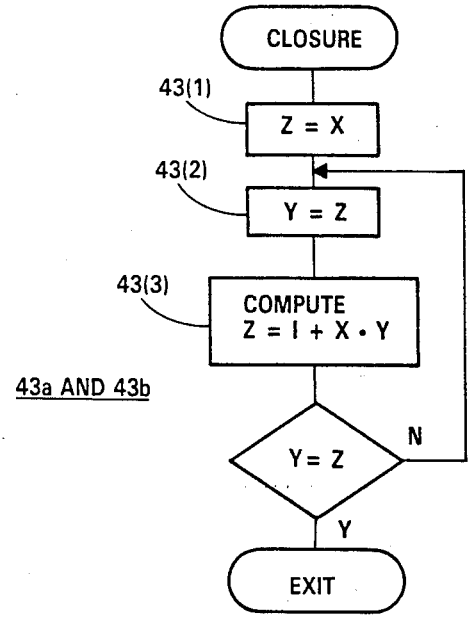
Figure 3M:
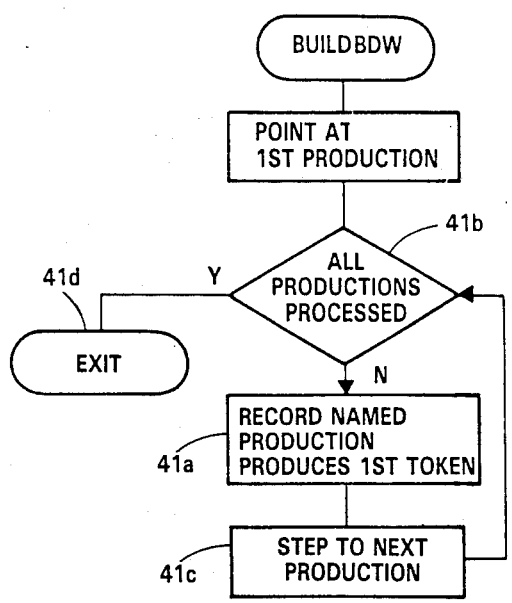
Figure 3P:
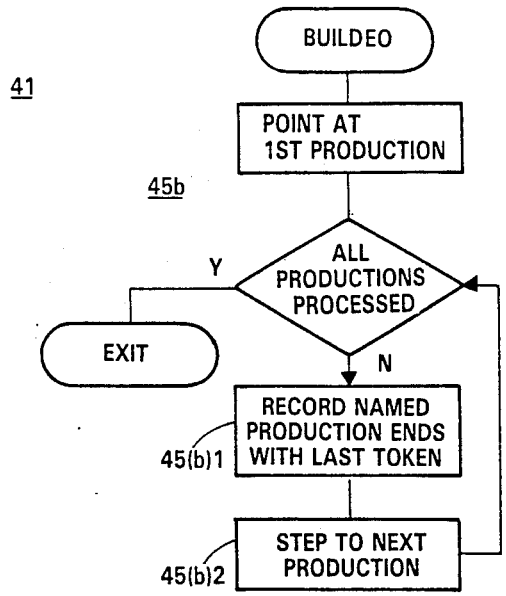
Figure 3Q:
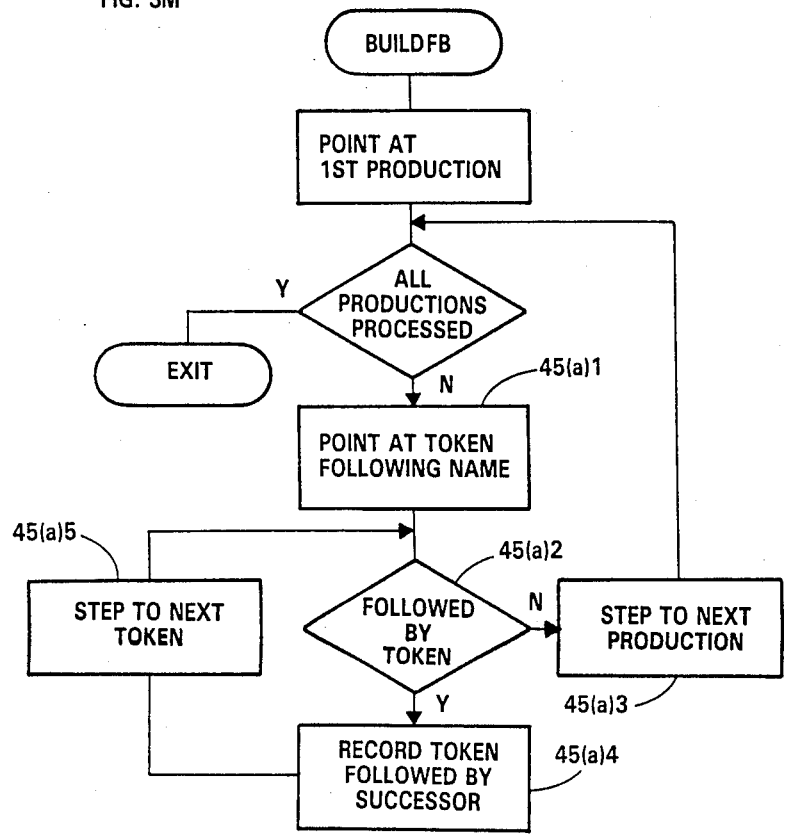

Referring to FIGS. 3a through 3q, a detailed flow diagram is illustrated representing the function of the ATBNF processor 10a1A portion of the translator program 10a1. In FIG. 3a, an overall flow diagram of the processor 10a1A portion is illustrated. Flow diagrams representing a further breakdown of the processor 10a1A portion of FIG. 3a are illustrated in FIGS. 3b through 3q. In FIG. 3a, the processor 10a1A portion of the translator writing program 10a1 functions in the following manner, as indicated by the following sequence of steps: the BNF definition of the user's source code is received. As indicated by block 31, the relations "Corners" and "use" are established. In block 33, Nth order recursions are removed. In block 35, simple recursions are removed. In block 37, redundant code strings are removed. In block 39, the relation "Production produces" is computed. In block 41, the relation "begins directly with" is built. In block 43a, the transitive closure of BDW is computed. In blocks 45a and 45b, the relations "followed by" and "ends with" are sequentially computed. In block 43b, the relation "end of" is computed. In block 47, the relation "followed by" is sequentially computed. In block 49, production selectors are created. As indicated by block 51, if a conflict exists, instances are computed and the above process is repeated in sequence beginning with the removal of simple recursions. If a conflict does not exist, code is created, that is, the transformed BNF definition of the user's source code is created.

In FIG. 3b, a flow diagram is illustrated representing the steps required to establish corners and use, block 31 of FIG. 3a, the first of the above-mentioned functional steps associated with the processor 10a1A portion of the translator writing program 10a1. In FIG. 3b, in block 31a, the step "point to first production" is illustrated. If all productions are not processed, the steps indicated in blocks 31b are implemented. If all productions are processed, the step "compute transitive closure 'used in corner'", block 31c, is implemented. In FIG. 3c, a flow diagram is illustrated representing the steps required to remove the Nth order recursions, block 33 of FIG. 3a, the second of the above-mentioned functional steps. In FIG. 3c, the step "point to first non-terminal" is first implemented, as indicated by block 33d. If all non-terminals are not processed, the steps indicated in blocks 33e are implemented. If all non-terminals are processed, the step "point to first production" is implemented, as indicated by block 33f. If all productions are not processed, the steps indicated by blocks 33g are implemented. If all productions are processed, three subroutines are called-up and implemented in sequence. The three sub-routines are utilized in the process of removing the Nth order recursions, that is, SORTXFM indicated by block 33a, HOLDXFM indicated by block 33b, and BUILDUSEC indicated by block 33c. In FIG. 3d, the BUILDUSEC subroutine 33c and the SORTXFM subroutine 33a is illustrated in flow-chart form. In FIG. 3e, the HOLDXFM subroutine 33b is illustrated in flow chart form.

In FIG. 3e, the HOLDXFM subroutine 33b begins by pointing to the first production 33b. If all productions are processed, end, block 33b2. If all productions are not processed, put production in temporary area, block 33b3. If the production is the required production, put production in the output area, block 33b4 and step to the next production, block 33b5. Repeat steps 33b3, 33b4, and 33b5. If the production is not the required production, but if it is used only one time, skip to step 33b5. If it is not used only one time, point at first production, 33b6, and ask "are all tokens examined?", block 33b7. If all tokens are examined and the production is too short, change to P---Null, block 33b8, add result to output area, block 33b9, and skip to step indicated by block 33b5. If the production is not too short, add result to output area, 33b9, and skip to step 33b5. If all tokens are not examined, but the token is used one time, substitute token use with definition, block 33b10, step to next token, block 33b11, and skip back to block 33b7. If the token is not used one time, skip to block 33b11 (step to next token) and then skip to block 33b7.

In FIG. 3f, a flow diagram is illustrated representing the steps required to create production selectors, block 49 of FIG. 3a, one of the functional steps associated with the processor 10a1A portion of the translator writing program 10a1. In FIG. 3f, the step "point to first production", block 49a, is first implemented. If all productions are processed, the end of the subroutine is reached. If all productions are not processed, the production name and "rightpart" is extracted, block 49b. The step "point at first token of rightpart" is implemented, block 49c. If all tokens are processed, steps 49d are implemented. If not, steps 49e are implemented. In FIG. 3g, a flow diagram is illustrated representing the steps required to compute instances, block 53 of FIG. 3a, the step performed if a conflict exists associated with the processor 10a1A portion of the translator writing program 10a1. However, in order to compute instances, three subroutines must be performed. Two of these subroutines, the INSTANCE subroutine 53a and the CHKCONFLICT subroutine 53b, are illustrated in flow-chart form in FIGS. 3h and 3i of the drawings, respectively. The other subroutine, SORTXFM 33a, is shown in FIG. 3d of the drawings.

Referring to FIG. 3h, the INSTANCE subroutine begins by pointing to the first production, block 53a1. If all productions are processed, end, block 53a2. If all productions are not processed, but the production does not have a conflict, put production in the output, block 53a3, step to the next production, block 53a4, and repeat the question "are productions processed?". If the production does have a conflict, find the first non-terminal, block 53a5 and, if not found, put production in output, block 53a6, and skip to block 53a4. If found, point to first production, block 53a7. If all productions are examined, skip to block 53a4. If all productions are not examined, and the name of the production is nonterminal, substitute definition, block 53a8, put result in output, block 53a9, and step to the next production, block 53a10. If the name of the production is not nonterminal, step to the next production, 53a10.

Referring to FIG. 3i, the CHKCONFLICT subroutine begins by setting 1 to name of first nonterminal, block 53b1. If all nonterminals are examined, end, block 53b2. If all are not examined, extract selectors for all occurences of production with name 1, block 53b3. If any terminal is used more than once, add 1 to list of conflict productions, block 53b4, set 1 to name of next nonterminals, block 53b5, and repeat the question "are all nonterminals examined?". If any terminal is not used more than once, skip to step 53b5.

Referring to FIG. 3j(a), a flow diagram of the RECURS subroutine, step 35 shown in FIG. 3a, is illustrated, this step performing the relation "remove simple recursions". In FIG. 3j(a), block 35b indicates to point to the first production. If all productions are processed, point to the first production in the temp list, as indicated by block 35c. If all productions are not processed, get the name of the first production, block 35d. If its not left recursive, add the production to the end of the temp list, block 35e, and step to the next production. If the first production is left recursive, but it is not a short production, put the production at the front of the temp list and step to the next production, blocks 35f and 35g. However, if the first production is left recursive and it is a short production, step to the next production, block 35f. Following step 35c, if all productions are processed, exit. If all productions are not processed, remove the production from the templet. If the production is left recursive, get temp name T, block 35h, output production T---AT, output T---null, block 35i, and perform an APPEND subroutine, block 35a, wherein the remaining productions in the temp list are corrected. If the production is not left recursive, add production to the end of output, block 35j, and determine if all productions are processed.

Referring to FIG. 3j(b), the APPEND subroutine 35a is illustrated. Point to first production, block 35a1. If all productions are not processed, name match X, replace with X---AT, and step to the next production, blocks 35a2 and 35a3. If all productions are processed, exit.

Referring to FIG. 3k, a flow diagram of the FACTOR subroutine, step 37 shown in FIG. 3a, is illustrated, this subroutine performing the "remove redundant code strings" relation. Point to the first production and extract production. If the production is empty, but all productions are not processed, put production in comparison, compare point=Q, and extract production, blocks 37a, 37b, 37c, 37d, 37e, and 37f. If production is not empty, and all productions are processed, output comparison and exit, blocks 37g and 37h. If all productions are not processed, the relation "anything compare" is true, and the relation "same as before" is also true, output T---common part and extract production, blocks 37i, 37j, 37k. If the relation "anything compare" is not true, output comparison and put production in comparison, block 37e. If the relation "same as before" is not true, get temp name, output T--common of compare, create unique part of compare---compare, T, output T---common of production, change length of common and extract Referring to FIG. 3L, a flow diagram of the subroutine COLLECTOP is illustrated, step 39 shown in FIG. 3a, wherein the relation "production produces" is computed. Build initial array of relation "produces". Point to first production, block 39a. If all productions are processed, compute transitive closure and exit, block 39b. If all productions are not processed, record the named production which produces the first token, step to next production, blocks 39c and 39d.

Referring to FIG. 3N, the subroutine CLOSURE is illustrated, steps 43a and 43b shown in FIG. 3a. In these subroutines, the transitive closure of BDW and the relation "end of" are computed. Let Z=X and Y=Z, blocks 43(1) and 43(2). Compute Z=1+X(Y), block 43(3). If Y=Z, exit. If Y is not equal to Z, let Y=Z and repeat steps.

Referring to FIG. 3M, the subroutine BUILDBDW, step 41 shown in FIG. 3a, is illustrated. This subroutine builds the relation "begins directly with". Point to first production. If all productions are not processed, block 41c, record the named production which produces the first token, block 41a, step to next production, block 41b, and repeat step 41c, otherwise exit, block 41d.

Referring to FIG. 3P, the subroutine BUILDEO, step 45(b) shown in FIG. 3a, is illustrated. This subroutine computes the "ends with" relation. In this subroutine, point to the first production. If all productions are not processed, record the named production which ends with the last token, block 45(b)1, step to the next production, block 45(b)2. If all productions are processed, exit, otherwise repeat step 45(b)1.

Referring to FIG. 3Q, the subroutine BUILDFB, step 45(a) shown in FIG. 3a, is illustrated. This subroutine computes the relation "followed by directly". Point to the first production. If all productions are not processed, point at token following name, block 45(a)1, and step to the next production if the production is not followed by a token, blocks 45(a)2 and 45(a)3, otherwise record the token followed by successor, step to the next token, and repeat step 45(a)2, blocks 45(a)4 and 45(a)5. If all tokens are processed, exit.

Figures 4A, 4B:
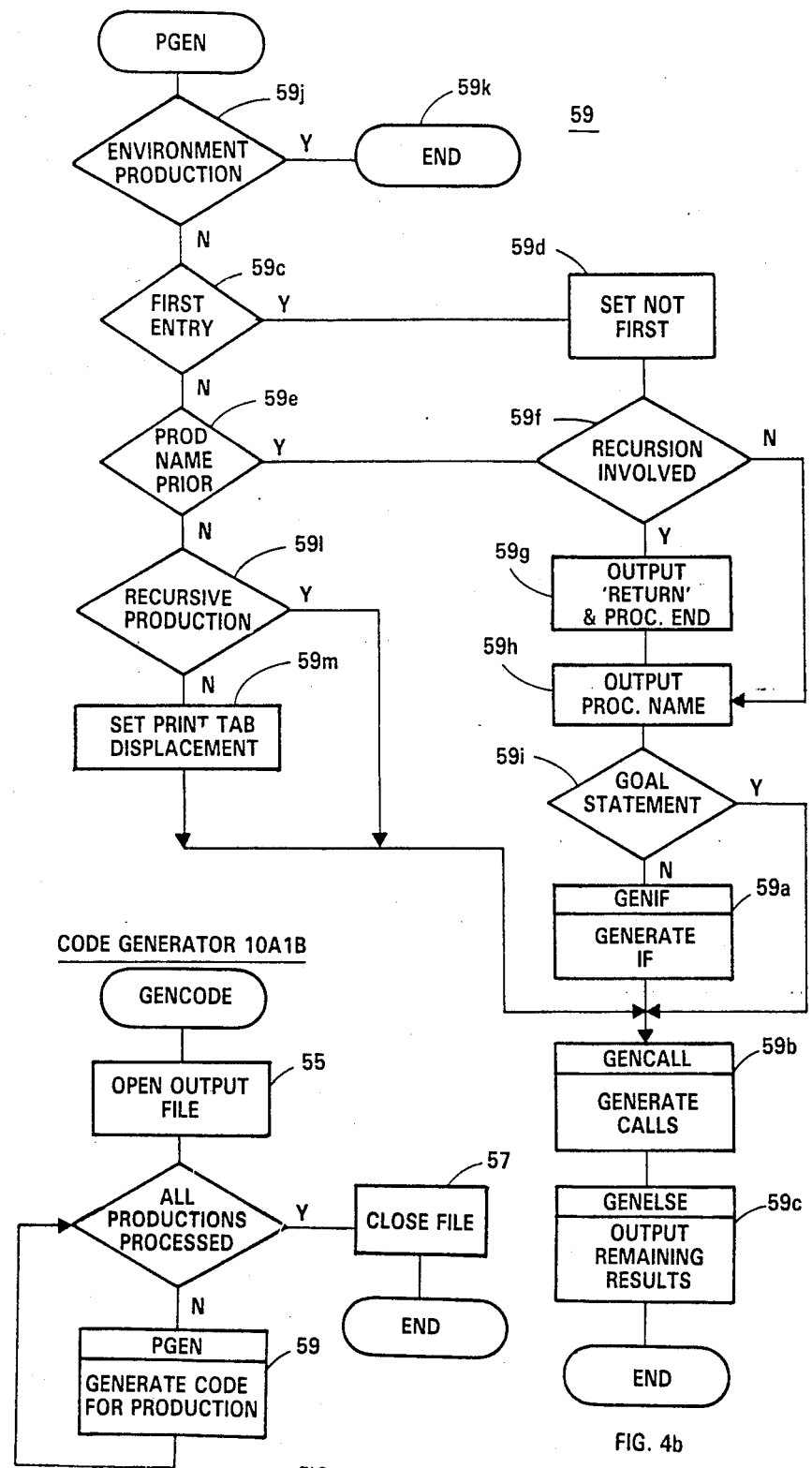
FIGS. 4a through 4e illustrate a flow diagram representing the code generator portion of the translator writing program of FIG. 2.

Referring to FIG. 4a, an overall flow diagram of the code generator 10a1B portion of the translator writing program 10a1 is illustrated. The functional steps comprising this portion of the translator writing program 10a1 include opening the output file, block 55, closing the output file if all productions are processed, block 57, and generating code for production if all productions are not processed, block 59. Upon completion of this last step, the output file is closed if all productions are processed. The above-mentioned step involving generating code for production, block 59 in FIG. 4a, is further subdivided into functional steps, as illustrated in FIG. 4b of the drawings.

Referring to FIG. 4b, if the relation "environment production" is true, end, otherwise if first entry, set not first, blocks 59j, 59k, 59c and 59d. If not first entry, and production name prior is true, or when set not first has been implemented, ask "is recursion involved", block 59e and 59f. If a recursion is involved, output return and proc end, and output proc name. If recursion is not involved, output proc name, blocks 59g and 59h. If goal statement is not true, do GENIF subroutine, then do GENCALL subroutine; however, if goal statement is true, go to GENCALL and do GENCALL subroutine, blocks 59i, 59a, and 59b. If prod name prior is not true, block 59e, and recursive production is not true, set print tab replacement and do GENCALL subroutine, blocks 59L, 59m. However, if prod name prior is not true, but recursive production is true, do the GENCALL subroutine. When the GENCALL subroutine is complete, do the GENELSE subroutine and end, block 59c.

Three subroutines are illustrated in FIG. 4b, namely, the GENIF subroutine 59a, the GENCALL subroutine 59b, and the GENELSE subroutine 59c. These subroutines are further subdivided into functional steps, as illustrated in FIGS. 4c, 4d, and 4e, respectively.

Figure 4C:
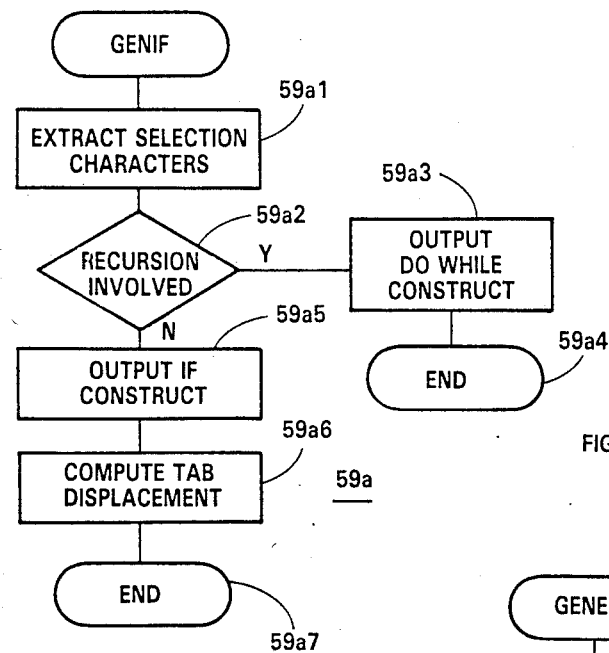

Referring to FIG. 4c, in the GENIF subroutine 59a, extract selection characters, block 59a1. If a recursion is involved, output do while construct and end, blocks 59a2, 59a3, 59a4. If a recursion is not involved, output if construct, compute tab displacement, and end, blocks 59a5, 59a6, and 59a7.

Figure 4E:
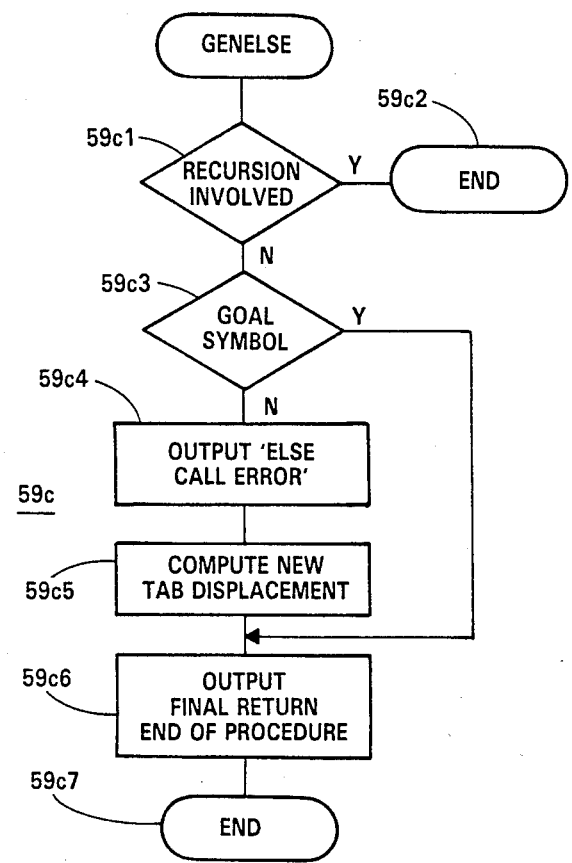

Referring to FIG. 4e, in the GENELSE 8 subroutine 59c, if a recursion is involved, end, block 59c1 and 59c2. If a recursion is not involved, and the relation "goal symbol" is not true, output "else call error", compute new tab displacement, output final return end of procedure, and end, blocks 59c3, 59c4, 59c5, 59c6, and 59c7. If the relation "goal symbol" is true, output final return end of procedure and end, block 59c3, 59c6, and 59c7.

Figure 4D:
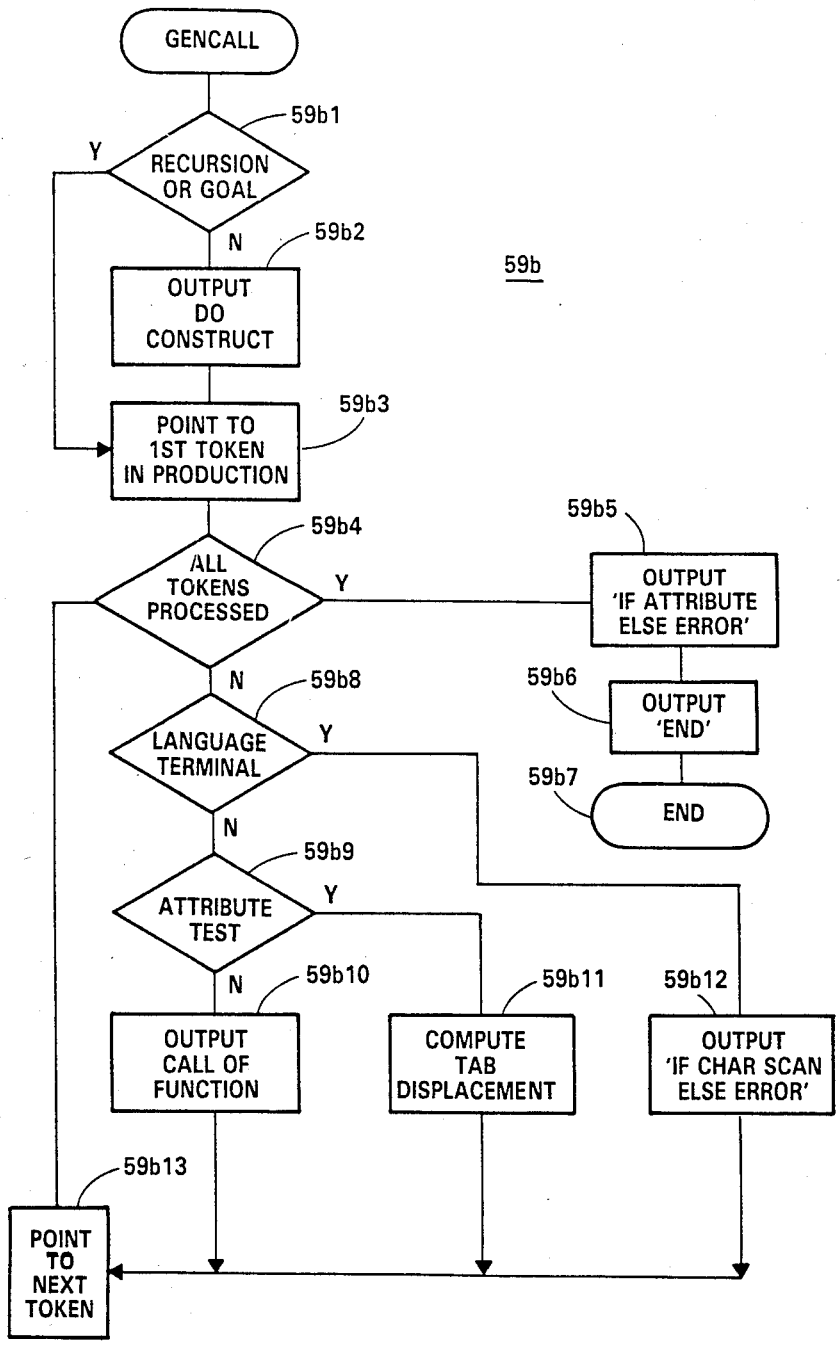

Referring to FIG. 4d, in the GENCALL subroutine 59b, if "recursion or goal" is not true, output do construct, and point to first token in production, blocks 59b1, 59b2, and 59b3. If "recursion or goal" is true, point to first token in production, block 59b3. If all tokens are processed, output "if attribute else errer", output "end" , and end, blocks 59b4, 59b5, 59b6, and 59b7. If all tokens are not processed, and "language terminal" is not true, and attribute test is not true, output call of function and point to the next token, blocks 59b8, 59b9, 59b10, and 59b11. If language terminal is true, output "if char scan else error" and point to the next production, blocks 59b8, 59b12, and 59b11. If language terminal is not true, but attribute test is true, compute tab displacement and point to the next production, blocks 59b8, 59b9, 59b13, and 59b11. Repeat step 59b4.

Figure 5:
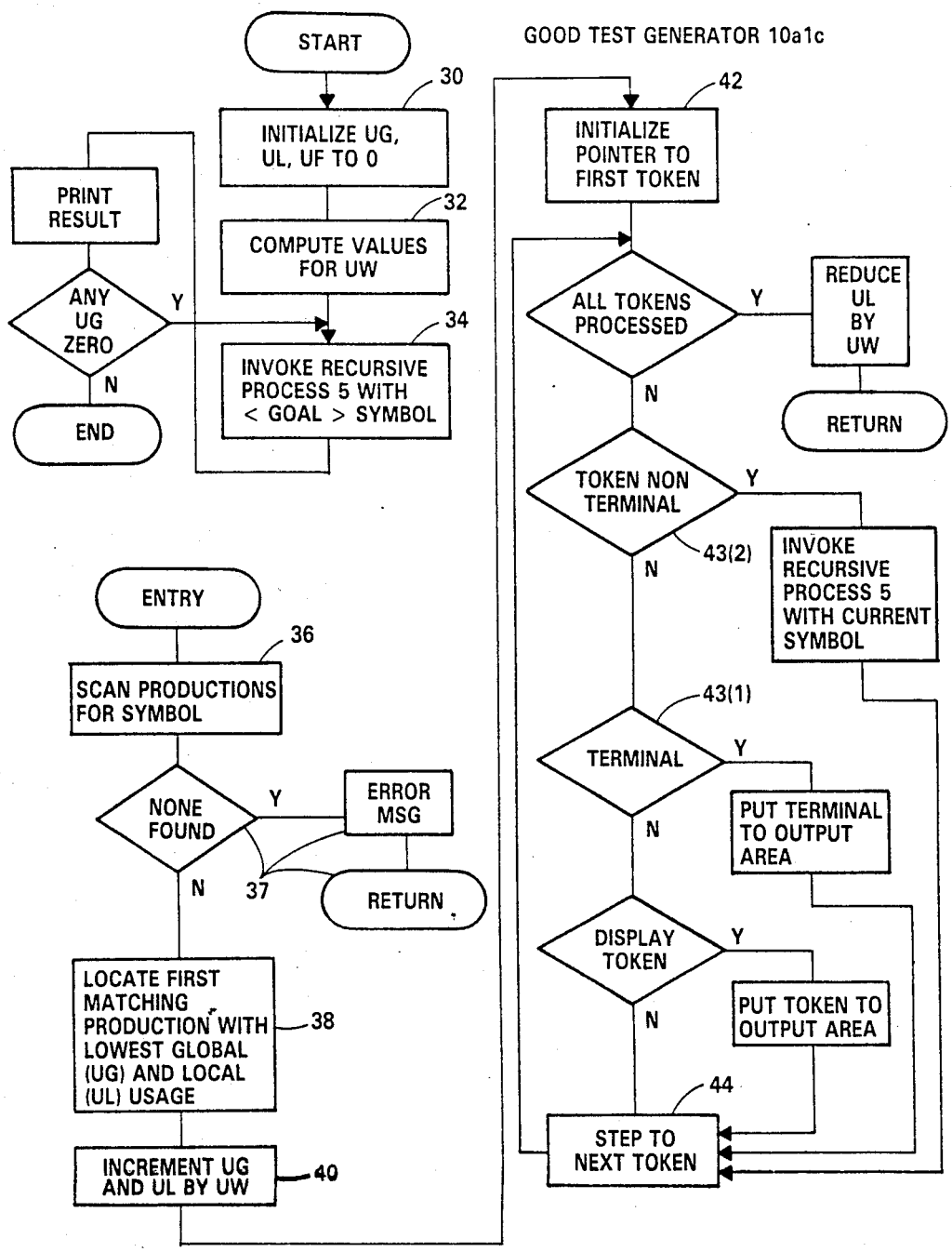
FIG. 5 illustrates a flow diagram representing the "good" testcase generator portion of the translator writing program of FIG. 2.

Referring to FIG. 5, an overall flow diagram of the "good" testcase generator 10a1C portion of the translator writing program 10a1 is illustrated.

The generation of testcases depends upon an initialization process that uses the internal data collected describing the language definition. For example, selection values are used to determine which production choice is to be used in the run time environment of the compiler/interpreter. In addition, four other data items are created which pertain to productions, namely, a global usage vector (UG) which describes the degree of usage during the testcase generation process, a local usage vector (UL) which describes the degree of usage of a production during the generation of a specific testcase instance, a production weight vector (UW) which describes the degree to which a particular production should or should not be used, and a global failure usage vector (UF) which describes the degree to which failure testcases have been created for a particular production. Block 30 of FIG. 5 represents an initialize step wherein the vectors UG, UL, and UF are initialized to zero(0).

Block 32 of FIG. 5 requires the computation of values for vector UW. The ATBNF processor 10a1A utilizes the vector UW to limit the degree of recursions resulting in replicated testcases, the UW entry for a recursive production being equal to the number of tokens (terminals, nonterminals, attributes, and transformations).

Nonrecursive productions are given a UW entry of 1. In this way, the number of testcases created to verify the implementation of a compiler/interpreter is kept to a manageable size.

Block 34 requires the invocation of recursive process 5 with <goal> symbol. The successful testcases are created by a recursive process that starts scanning the productions beginning with the <goal> symbol.

Block 36 requires scanning productions for symbols. On each recursion, the list of all productions is scanned to determine which of them have matching names. If a matching name cannot be found, an error exists in the BNF language definition and the testcase generation process stops, blocks 37.

Block 38 requires locating a first matching production with the lowest global (UG) and lowest local (UL) usage vectors. From the set of productions identified, a production is selected whose global and local usage vectors are a minimum. If there are two such choices, the first encountered is used.

Block 40 requires incrementing vector UG and vector UL by the value of vector UW. The global and local usages of the production are increased by the corresponding entry in the vector UW and the new production is scanned token by token.

Block 42 requires initializing the pointer to the first token. If the token is an attribute or transformation, the token is optionally placed in the testcase specification. If the token is a terminal, block 43(1), it is likewise placed in the testcase specification. If the token is a non-terminal, block 43(2), the recursive process is invoked using the new token as the starting point.

Block 44 requires stepping to the next token. The recursive process of examining tokens and restating scans continues until the end of a production is reached. The local usage is reduced and the process resumes with the prior reference to the token naming the production.

When all recursions of the testcase generation process are completed, it may happen that all productions may not have used globally. In this case, the testcase process resumes leaving the entries of UG unchanged. This process of examining UG and resuming continues until all entries of UG are different from zero.

The fact that vector UG is nonzero for every entry ensures that every production of the language specification has been used at least once, and, at the same time, ensures that the operating environment for the production will work in the run time environment.

Figure 6A:
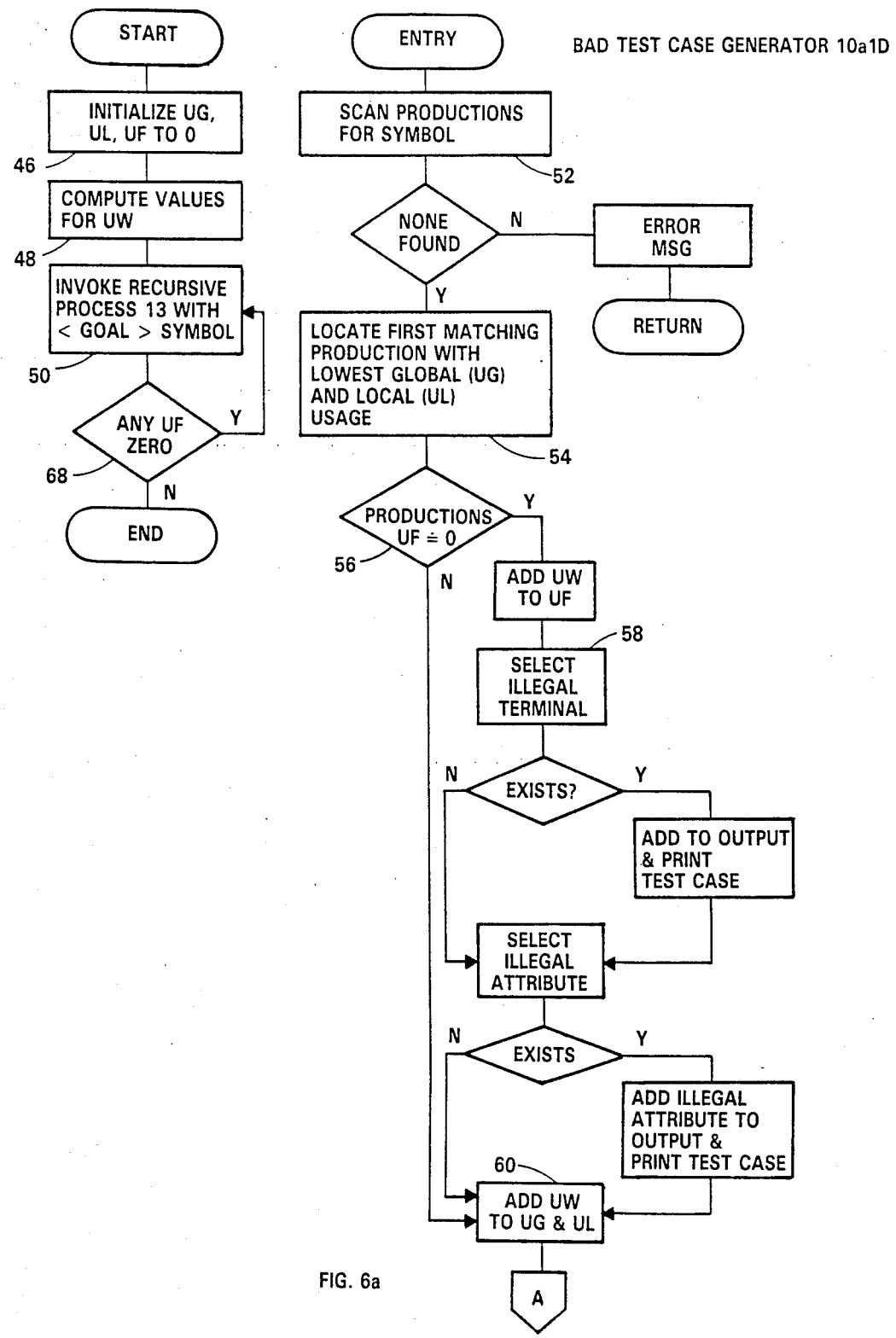
FIGS. 6a through 6b illustrate a flow diagram representing the "bad" testcase generator portion of the translator writing program of FIG. 2.
Figure 6B:
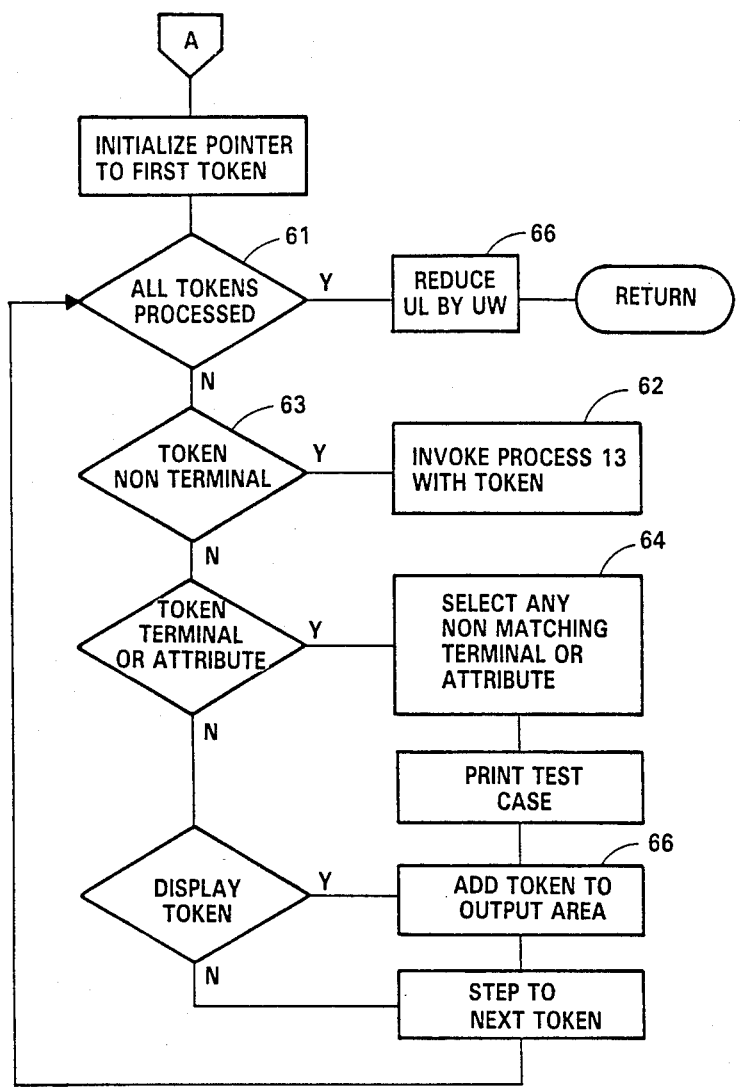

Referring to FIGS. 6a and 6b, flow diagrams of the "bad" testcase generator 10a1D portion of the translator writing program 10a1 are illustrated.

In FIG. 6a, blocks 46 and 48 require the initialization of vectors UG, UL and UF to zero and the computation of values for UW. These functional steps are the same as the steps associated with blocks 30 and 32 of FIG. 5. The comments made above with respect to blocks 30 and 32 of FIG. 5 apply to blocks 46 and 48 of FIG. 6a.

Block 50 requires the invocation of recursive process 13 with the <goal> symbol. The failure testcases are likewise created by a recursive process that starts scanning the productions beginning with the <goal> symbol.

Block 52 requires the scanning of productions for symbols. On each recursion, the list of all productions is scanned to determine which ones (and options) have a matching name. If a matching name cannot be found, an error exists in the language definition and the testcase generation process stops.

Block 54 requires the locating of the first matching production with the lowest global(UG) and the lowest local(UL) usage. From the set of productions identified, a production is selected whose global and local usage is a minimum. If there are two such choices, the first encountered is used.

In block 56, a question is asked whether productions UF=0. The vector representing failures is checked to see if a production of this name has already been used to create a failure case. If not, the vector entry for the production is increased by the usage weight, and a failure test case is created.

Block 58 requires the selection of an illegal terminal. The failure testcase is created by determining a character or attribute from the production selectors that cannot occur in the beginning position of the production. If such a character or attribute exists, the character or attribute is appended to an output line as an additional failure testcase. If no such character or attribute exists, the failing state is not reached for this production category.

Block 60 requires the addition of UW to UG and UL. The global and local usages of the production are increased by the corresponding entry in the vector UW and the new production is scanned token by token. If the token is a transformation, the token is optionally placed in the testcase specification.

In FIG. 6b block 62 requires invocation of process 13 with token. If the token is a nonterminal, block 61, the recursive process is invoked using the new token as the starting point.

Block 64 requires the selection of any nonmatching terminal or attribute. When the token is a terminal character or attribute, block 63, an attribute or character that will induce an error is created. If the token is an attribute, the output line is created with a valid character following the attribute.

Blocks 66 require adding a token to an output area and reducing the vector UL by UW. The recursive process of examining tokens and restarting scans continues until the end of a production is reached. The local usage is reduced and the process resumes with the prior reference to the token naming the production.

In FIG. 6a, block 68 questions whether any vector UF is zero. When all recursions of the testcase generation process are completed, it may happen that all productions may not have been used globally in the failure testcase creation process (at least one entry of UF is still 0). In this case, the test case process resumes leaving the entries of UF unchanged. The process of examining UF and resuming continues until all entries of UF are different from zero (0).

The fact that UF is nonzero for every entry ensures that every production of the language specification has been used at least once, that the processor supports only the language as specified, and, at the same time, ensures that the operating environment for the production will work in the run time environment in the presence of error inputs.

With respect to the translator writing system 10 of the present invention, prior art translator writing systems did not account for data attribute specifications or their interactions in the grammar. Prior art systems required manual placement of semantic module invocations and provided no support for the creation of testcases to check out and verify the translator program implementation in its run time environment. The translator writing system 10 of the present invention, inclusive of the translator writing program 10a1, is constructed so that is can be readily modified to create a parallel interpreter/executor environment, and it contains enough syntax, semantic, and attribute information about the language in order to enable it to generate application programs and operating systems once their specifications have been transformed into a language specification in BNF form.

In the following paragraphs, a sample BNF definition of a user's source code is presented. The source language is the language of SQL. A transformed BNF definition of the user's source code is also provided as a result of the functions performed by the ATBNF processor 10a1A portion of the translator writing program 10a1 in response to the BNF definition. A generated translator program is provided as a result of the functions performed by the code generator 10a1B portion of the translator writing program 10a1 in response to the transformed BNF definition. A set of sample "good" testcases are provided below for testing the translator program. A set of sample "bad" testcases are also provided below for testing the translator program.

The following program, illustrated in TABLE 1, sets forth a sample set of language productions representing a BNF definition of a user's source code written in the language of SQL:

TABLE 1

```
<goal> ::= <query>F(XXXEXGOL)
<QUERY> ::=
<SELECTCL><FROMCL>F(XXXOPWHR)<WHERECL>F(XXXCLWHR),
| <SELECT CL><FROMCL>
<SELECTCL> ::= 'SELECT'F(XXXOPSEL) '*'
F(XXXSTKAS)F(XXXCLSEL)
<FROMCL> ::= 'FROM' F(XXXOPFRM)F(XXXSTKTN) 'ID'
F(XXXEXFRM)
<WHERECL> ::= 'WHERE'F(XXXSVEID) 'ID'
F(XXXSTKID)F(XXXSTKOP), '=' A(NUM)F(XXXSTKIN) 'INT'
F(XXXPOPOP), | 'WHERE' F(XXXSVEID) 'ID'
F(XXXSTKID)F(XXXSTKOP), '=' A(STR)F(XXXSTKQS) 'QST'
F(XXXPOPOP)
```

The following program, illustrated in TABLE 2, represents a sample transformed BNF definition of a user's source code, written in the language of SQL, generated by the ATBNF processor 10a1 of FIG. 2, in response to the input sample BNF definition appearing in TABLE 1:

TABLE 2

```
<GOAL> ::= 'SELECT' F(XXXOPSEL) '*' F(XXXSTKAS)
F(XXXCLSEL), <T0034035> F(XXXEXGOL)
<WHERECL> ::= 'WHERE ' F(XXXSVEID)
'ID ' F(XXXSTKID)
F(XXXSTKOP) '=', <T0031>
<T0034035> ::= 'FROM' F(XXXOPFRM) F(XXXSTKTN) 'ID'
F(XXXEXFRM) <T0032>
<T0031> ::= A(NUM) F(XXXSTKIN) 'INT' F(XXXPOPOP)
<T0031> ::= A(STR) F(XXXSTKQS) 'QST' F(XXXPOPOP)
<T0032> ::= ''''
<T0032> ::= F(XXXOPWHR) <WHERECL>
F(XXXCLWHR)
```

The sample transformed BNF definition illustrated in TABLE 2, generated by the ATBNF processor I0a1A, is the input to the code generator 10a1B. The code generator generates a sample translator program in response to the transformed BNF definition. The sample translator program is illustrated in APPENDIX A.

The translator writing program generates a series of sample valid testcases for testing the sample translator program. The sample valid testcases appear in TABLE 3 below:

TABLE 3

```
SELECT * FROM ID ;
SELECT * FROM ID WHERE ID = A(NUM) INT ;
SELECT * FROM ID ;
SELECT * FROM ID WHERE ID = A(STR) QST ;
```

The translator writing program generates a series of sample unsuccessful or "bad" testcases for testing the sample translator program. The unsuccessful testcases appear in TABLE 4 below:

TABLE 4

```
SELECT
SELECT *
SELECT* FROM
SELECT* FROM ID
SELECT* FROM ID ;
QST
SELECT QST
SELECT * QST
SELECT * FROM QST
SELECT * FROM ID QST
SELECT * FROM ID ; QST
SELECT * FROM ID WHERE QST
SELECT * FROM ID WHERE ID QST
SELECT * FROM ID WHERE ID = A(BAD) QST
SELECT * FROM ID WHERE ID = A(NUM) QST
SELECT * FROM ID WHERE ID = A(NUM) INT QST
SELECT * FROM ID WHERE ID = A(STR) INT
SELECT * FROM ID WHERE ID = A(STR) QST QST
SELECT * FROM ID WHERE ID = A(STR) QST ; QST
```

APPENDIX A

```
Goal: /* PROCEDURE RECURSIVE */
IF NXTSYMB = 'SELECT'
THEN CALL XXXSCAN;
ELSE CALL XXXERROR;
CALL XXXOPSEL;
IF NXTSYMB = '*'
THEN CALL XXXSCAN;
ELSE CALL XXXERROR;
CALL XXXSTKAS;
CALL XXXCLSEL;
CALL T0034035;
CALL XXXEXGOL;
RETURN;

WHERECL: /* PROCEDURE RECURSIVE */
DO FOREVER; /* START OF PRODUCTION WHERECL */
IF (NXTSYMB = 'WHERE')
THEN
DO;
CALL XXXSCAN;
CALL XXXSVEID;
IF NXTSYMB = 'ID'
THEN CALL XXXSCAN;
ELSE CALL XXXERROR;
CALL XXXSTKID;
```

-continued

APPENDIX A

```
CALL XXXSTKOP;
IF NXTSYMB = '='
THEN CALL XXXSCAN;
ELSE CALL XXXERROR;
CALL T0031;
RETURN;
END;
ELSE
DO;
CALL XXXERROR;
RETURN;
END;
END; /* END OF PRODUCTION WHERECL */

T0034035: /* PROCEDURE RECURSIVE */
DO FOREVER; /* START OF PRODUCTION T0034035 */
IF (NXTSYMB = 'FROM')
THEN
DO;
CALL XXXSCAN;
CALL XXXOPFRM;
CALL XXXSTKTN;
IF NXTSYMB = 'ID'
THEN CALL XXXSCAN;
ELSE CALL XXXERROR;
CALL XXXEXFRM;
CALL T0032;
RETURN;
END;
ELSE
DO;
CALL XXXERROR;
RETURN;
END;
END; /* END OF PRODUCTION T0034035 */

T0031: /* PROCEDURE RECURSIVE */
DO FOREVER; /* START OF PRODUCTION T0031 */
IF (0¬=INDEX(' NUM ANY ',' '||ATTRIBUTE||' '))
THEN
DO;
CALL XXXSTKIN;
IF NXTSYMB = 'INT'
THEN CALL XXXSCAN;
ELSE CALL XXXERROR;
CALL XXXPOPOP;
RETURN;
END;
ELSE
IF (0¬=INDEX(' STR ANY ',' '||ATTRIBUTE||' '))
THEN
DO;
CALL XXXSTKQS;
IF NXTSYMB = 'QST'
THEN CALL XXXSCAN;
ELSE CALL XXXERROR;
CALL XXXPOPOP;
RETURN;
END;
ELSE
DO;
CALL XXXERROR;
RETURN;
END;
END; /* END OF PRODUCTION T0031 */

T0032: /* PROCEDURE RECURSIVE */
DO FOREVER; /*START OF PRODUCTION T0032 */
IF (NXTSYMB = ';')
THEN
DO;
RETURN;
END;
ELSE
IF (NXTSYMB = 'WHERE')
THEN
DO;
CALL XXXOPWHR;
CALL WHERECL;
CALL XXXCLWHR;
RETURN;
```

-continued

APPENDIX A

```
END;
ELSE
DO;
CALL XXXERROR;
RETURN;
END;
END; /* END OF PRODUCTION T0032 */
```

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

I claim:

1. A translator writing system for developing a translator program that transforms a user's source code into object code, comprising:
   means for receiving a program into said translator writing system, said program representing a summary of the pertinent characteristics associated with the user's source code; and
   developing means responsive to said program for developing said translator program, said developing means including testing means for testing the developed translator program, the testing means including a data base comprising a plurality of statements, the plurality of statements being examples of all correct uses of program statements in said users source code, the testing including an interrogation of said developed translator program using each statement of said plurality of statements thereby producing results,
   whereby analysis of said results reveals if errors exist within said developed translator program.

2. The translator writing system of claim 1, wherein said summary of the pertinent characteristics of the user's source code represented by said program includes a set of attribute specifications describing the language of said source code, said source code having a grammar, said summary further including means for reconciling the interaction of said attribute specifications in said grammar of said source code.

3. The translator writing system of claim 1 wherein the plurality of statements of said data base further represent examples of all incorrect uses of program statements in said user's source code.

4. A translator writing system for developing a completed translator program that transforms a user's source code into object code, comprising:
   means for introducing a program into said translator writing system, said program being a summary of the pertinent characteristics of the user's source code;
   developing means responsive to said program for developing said completed translator program, said developing measn further including,
   a correct testcase generator means for testing said translator program utilizing a plurality of correct program statement corresponding to the user's source code, and
   an incorrect testcase generator means for testing said translator program utilizing a plurality of incorrect program statements corresponding to the user's source code, the plurality of correct program statements and the plurality of incorrect program statements being examples of all correct and incorrect uses of program statements, respectively, in the user's source code.

5. A method of developing and testing a completed translator program, comprising the steps of:
  developing a summary program summarizing the pertinent characteristics associated with a user's source code, said source code being a language and including a plurality of program statements;
  entering said summary program into a translator writing system, said translator writing system developing said completed translator program by converting said summary program into said completed translator program; and
  testing said completed translator program by interrogating said translator program with examples of all correct uses of program statements in the language of said user's source code.

6. The method of claim 5, wherein the testing step further comprises the step of:
  interrogating said translator program with examples of all incorrect uses of program statements in the language of said user's source code.

7. A translator writing system for developing a completed translator program that transforms a user's source code into object code, comprising:
  means for receiving a program into said translator writing system, said program representing a summary of the pertinent characteristics of the user's source code; and
  developing means responsive to said program for developing said completed translator program, said developing means including testing means for testing the completely developed translator program, the testing means including a data base comprising a plurality of statements, the plurality of statements being examples of all incorrect uses of program statements of said user's source code, the testing including an interrogation of said developed translator program using each stastement of said plurality of statements thereby producing a plurality of error messages,
  whereby analysis of said error messages as to number and type reveals if all expected ones of said error messages were produced in response to said interogation.

8. A method of completely developing and testing a translator program, comprising the steps of:
  developing a summary program summarizing the pertinent characteristics of a user's source code, said source code being a language and including a pluraity of program statements;
  entering said summary program into a translator writing system, said translator writing system completely developing said trnaslator program by converting said summary program into said translator program; and
  testing said translator program by interrogating said translator program with examples of all incorrect uses of program statements in the language of said user's source code thereby producing a plurality of error messages and analyzing said error messages as to number and type.

* * * * *